(12) United States Patent
Yarvis et al.

(10) Patent No.: US 12,719,750 B2
(45) Date of Patent: Aug. 25, 2026

(54) METHODS AND APPARATUS TO AUTONOMOUSLY IMPLEMENT POLICIES AT THE EDGE

(71) Applicant: Intel Corporation, Santa Clara, CA (US)

(72) Inventors: Mark Yarvis, Portland, OR (US); Geoffrey Cooper, Palo Alto, CA (US); Bryon Nevis, Forest Grove, OR (US); Bruce Jones, Vancouver, WA (US); Bryan Rodriguez, Emmett, ID (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/344,714

(22) Filed: Jun. 29, 2023

(65) Prior Publication Data

US 2023/0344716 A1 Oct. 26, 2023

Related U.S. Application Data

(60) Provisional application No. 63/427,371, filed on Nov. 22, 2022.

(51) Int. Cl.

*H04L 41/08* (2022.01)
*H04L 41/0803* (2022.01)
*H04L 41/0894* (2022.01)

(52) U.S. Cl.

CPC ...... *H04L 41/0886* (2013.01); *H04L 41/0803* (2013.01); *H04L 41/0894* (2022.05)

(58) Field of Classification Search

CPC ............. H04L 41/0886; H04L 41/0803; H04L 41/0894; H04L 41/0895; H04L 41/5019; H04L 43/08; H04L 43/20; H04L 41/0806

See application file for complete search history.

(56) References Cited

U.S. PATENT DOCUMENTS 9,166,912 B2 * 10/2015 Yadav ........................ G06F 8/65
10,845,786 B2 * 11/2020 Chauvet ............. G05B 19/4185
11,937,103 B1 * 3/2024 Krasilnikov ........ H04L 41/0895
2016/0087956 A1 * 3/2016 Maheshwari ........... H04W 4/08 726/6
2017/0149838 A1 * 5/2017 Sood ..................... G06F 21/554
2018/0124158 A1 * 5/2018 Amento .............. H04L 41/0806

(Continued)

OTHER PUBLICATIONS

Kairos, "P2P Network: How Kairos leverage Peer-to-peer (P2P) to self-coordinate clusters at the edge," retrieved Jun. 26, 2023, from https://kairos.io/docs/architecture/network/, 1 page.

*Primary Examiner* — Javier O Guzman

(74) *Attorney, Agent, or Firm* — Hanley, Flight & Zimmerman, LLC

(57) ABSTRACT

Systems, apparatus, articles of manufacture, and methods are disclosed. An example apparatus is a first compute device comprising: interface circuitry to connect to a network; instructions; programmable circuitry to interpret a policy based on a first attribute and a second attribute to identify an action associated with the first compute device, the first attribute to describe the first compute device, the second attribute obtained via the interface circuitry from a second compute device to describe the second compute device; and provide the identification to an application on the first compute device to cause the application to perform the action based on the policy.

20 Claims, 28 Drawing Sheets

(56) References Cited

U.S. PATENT DOCUMENTS

| | | | | |
|---|---|---|---|---|
| 2019/0253319 | A1* | 8/2019 | Kampanakis | G06N 5/025 |
| 2019/0394143 | A1* | 12/2019 | Ayyappan | H04L 49/25 |
| 2020/0134207 | A1* | 4/2020 | Doshi | H04L 47/822 |
| 2021/0027415 | A1* | 1/2021 | Khalid | G06N 20/00 |
| 2021/0126826 | A1* | 4/2021 | Nolan | H04W 12/76 |
| 2022/0021585 | A1* | 1/2022 | Barton | H04L 47/125 |

* cited by examiner

METHODS AND APPARATUS TO AUTONOMOUSLY IMPLEMENT POLICIES AT THE EDGE

RELATED APPLICATION

This patent claims the benefit of U.S. Provisional Patent Application No. 63/427,371, which was filed on Nov. 22, 2022. U.S. Provisional Patent Application No. 63/427,371 is hereby incorporated herein by reference in its entirety. Priority to U.S. Provisional Patent Application No. 63/427,371 is hereby claimed.

BACKGROUND

Edge computing refers to a computing architecture in which edge compute devices are situated at base stations and/or other locations between endpoint devices and more centrally located infrastructure servers, cloud computing data centers, etc. The edge compute devices enable distribution of compute and memory resources in the computing architecture to reduce processing latency, distribute memory utilization, etc. For example, an endpoint device in an edge environment may offload workloads to one or more compute and/or memory resources of an edge compute device. The one or more compute and memory resources may be located in close proximity to the endpoint device. As a result, the endpoint device may obtain results with lower latency than in a centralized architecture that is limited to offloading workloads from endpoint devices to infrastructure servers, cloud computing data centers, etc.

BRIEF DESCRIPTION OF THE DRAWINGS

In general, the same reference numbers will be used throughout the drawing(s) and accompanying written description to refer to the same or like parts. The figures are not necessarily to scale.

Figure 1:
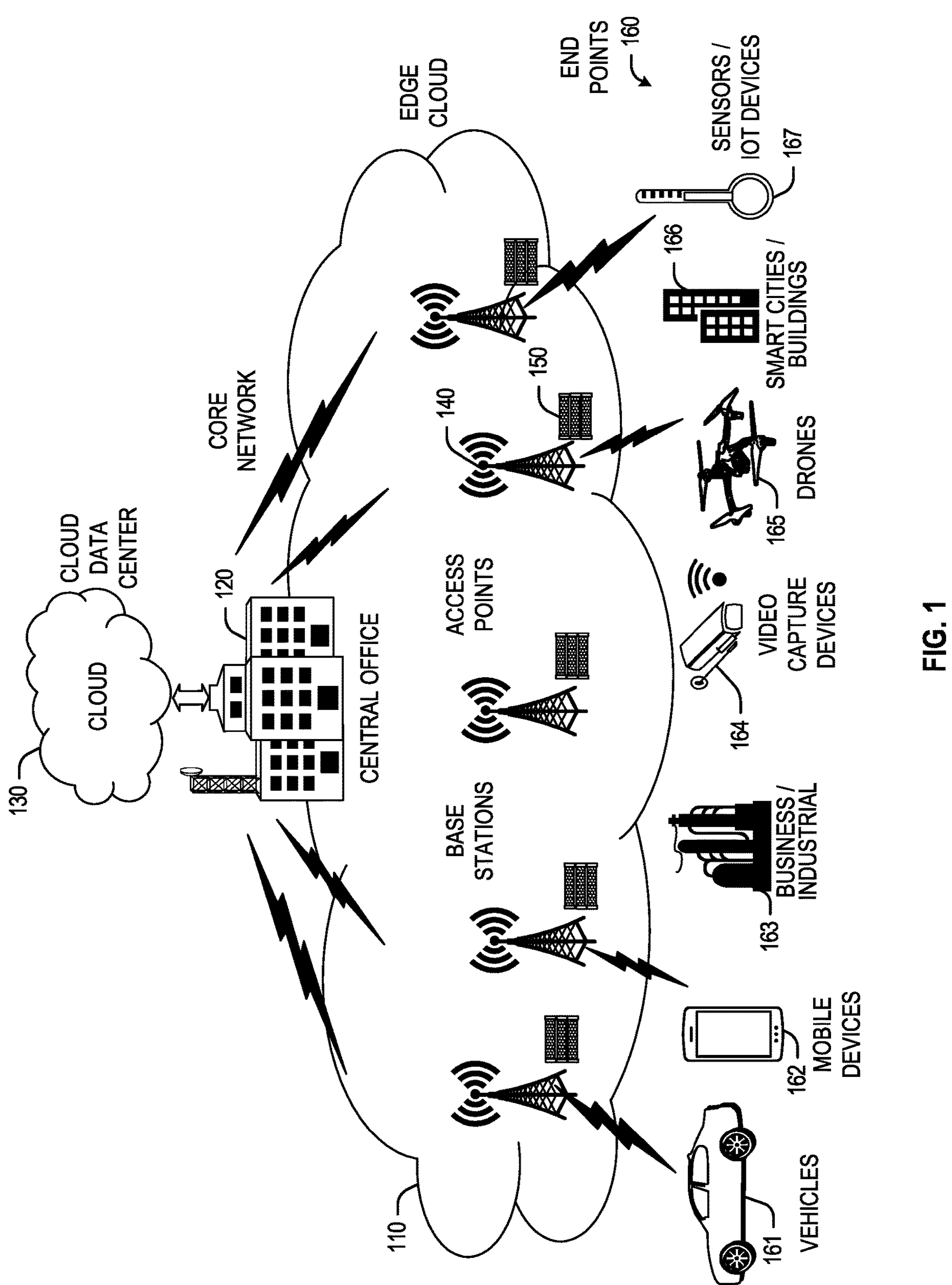
FIG. 1 illustrates an overview of an edge cloud configuration for edge computing in which the teachings of this disclosure can be implemented.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

DETAILED DESCRIPTION

In an edge computing environment, a group of edge devices may work together to execute workloads. In some examples, a large workload may be subdivided into smaller portions that multiple edge devices can run in parallel. Additionally or alternatively, one or more edge devices may execute instructions serially (e.g., the output of a first edge device may be used as an input for a second edge device). In some examples, a pipelined workload includes operations that involve both parallel and serial operations. For example, suppose a workload includes a first role to capture an image of an event, a second role to analyze the image, and a third role to act based on the analysis. In such an example, a first edge compute device executing the first role may capture a second event at the same time a second edge compute device executing the third role acts based on analysis of an image of a previous first event. If a third edge compute device executing the second role to analyze images takes longer than the execution of the first or third roles, multiple edge compute devices may be required to execute the second role in parallel to meet a throughput target of the entire system.

The process of organizing edge devices to execute a workload can be a difficult task. For example, a manufacturer or business seeking to utilize multiple edge devices together may need to determine the number of edge devices to utilize, the type of edge devices to utilize, the extent, if any, that the workload can be parallelized between the edge devices, etc. Additionally, if one or more edge devices execute workloads serially, the example manufacturer or business may need to determine how the one or more edge devices communicate with one another, the order in which the one or more edge devices execute their respective portions of the workload, etc.

In general, the complexity involved in answering the foregoing questions and implementing a corresponding compute environment may increase as the size and complexity of the assigned workload increases. Furthermore, the complexity of utilizing multiple edge devices together may additionally increase whenever the operating conditions of the compute environment change. Examples of changes in the operating conditions of such a compute environment may include, but are not limited to, a change in the workload, the addition or removal of an edge device from the group, a change in the geographic location of one or more edge devices, a transition between networks, etc.

Some clusters of edge devices rely on a central entity to make most or all of the decisions regarding how work will be distributed in the cluster. Such a central entity may send an initial set of instructions to edge devices when a workload is first assigned. The central entity may also be responsible for sending additional instructions throughout the execution of the workload, such as in response to changes in the operating conditions of the compute environment. The central entity may also collect telemetry from the multiple edge devices to support decision making. The central entity can consist of multiple components (e.g., multiple redundant copies) for high availability or scaling.

While central entities provide strong control over edge devices, clusters managed by central entities may lack resiliency to failures and partitioning. Furthermore, the cost of running and maintaining a central entity may become increasingly expensive as the number, variety, and size of workloads increase. Additionally, the cost of running and maintaining a central entity may add a prohibitive amount of overhead to a modestly scaled cluster of multiple edge devices. As such, clusters managed by central entities face both technical and logistical challenges for a variety of industries that aim to employ compute devices in a diverse and growing number of use cases.

Example methods, apparatus, and systems described herein implement example edge compute architectures that enable the decentralized, autonomous coordination of compute nodes in a cluster. Such example edge compute clusters are also referred to herein as a policy-based autonomous cluster at the edge (PACE). As used herein, edge devices that work together in a group to execute a workload may be referred to as a cluster. Also, as used herein, edge devices may be referred to as edge compute nodes, edge compute devices, etc.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits. In some examples, devices within the edge cloud 110 implement the PACE architecture as described in connection with FIGS. 4-24.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the number of resources needed for network services, through the distribution of more resources which are located closer both geographically and in network access time. In this manner, edge computing attempts to bring the compute resources to the workload data where appropriate or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
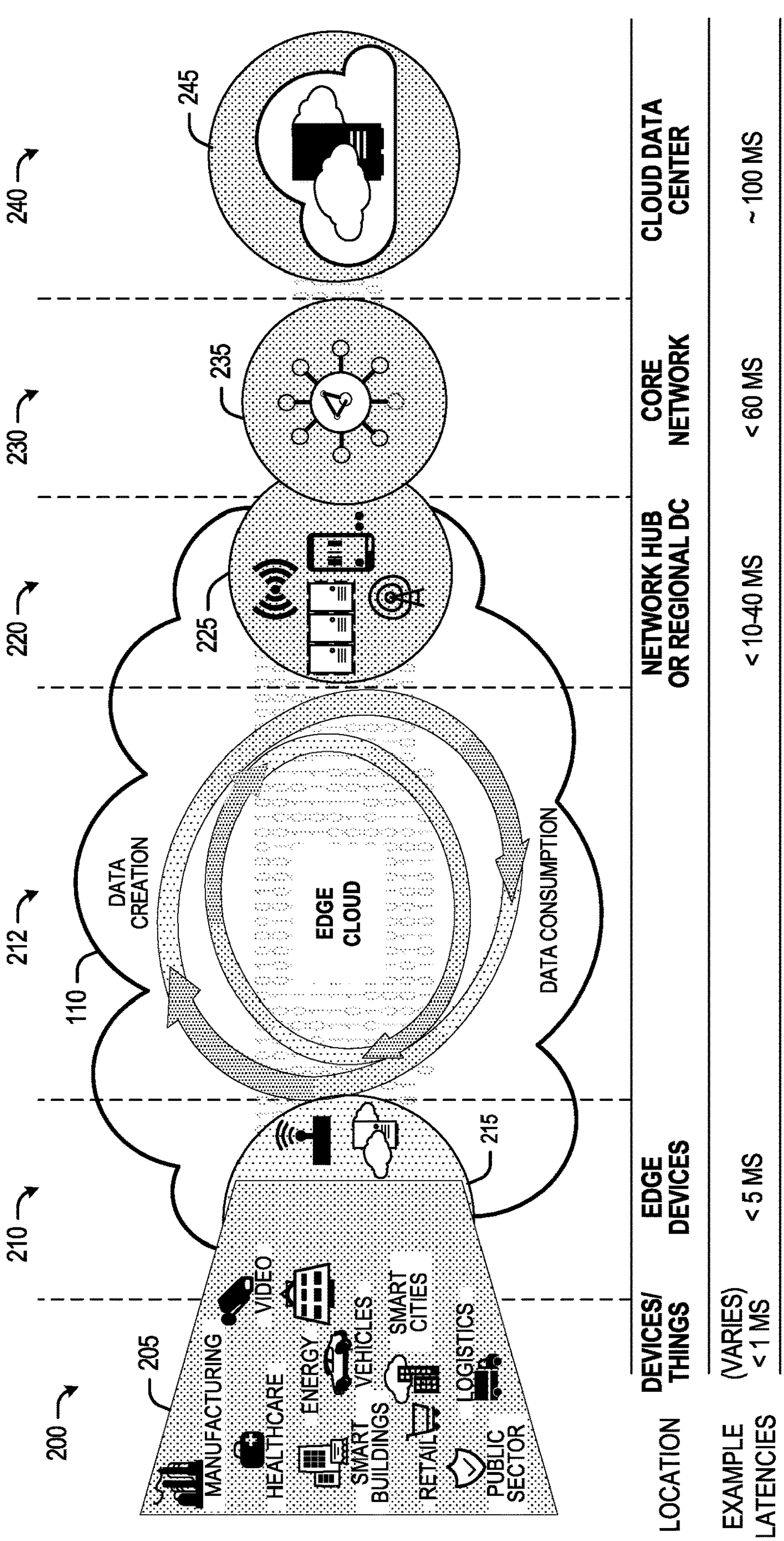
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted. In some examples, devices within the edge cloud 110 implement the PACE architecture as described in connection with FIGS. 4-24.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement operations to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These variations and service features enable a whole new class of applications (e.g., Virtual Network Functions (VNFs), Function as a Service (FaaS), edge as a Service (EaaS), standard processes, etc.), which cannot leverage conventional cloud computing due to latency or other limitations.

However, edge computing introduces the following caveats. The devices located at the edge may be resource constrained and therefore there is pressure on usage of edge resources. This pressure may be addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks, etc.) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input device such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Figure 3:
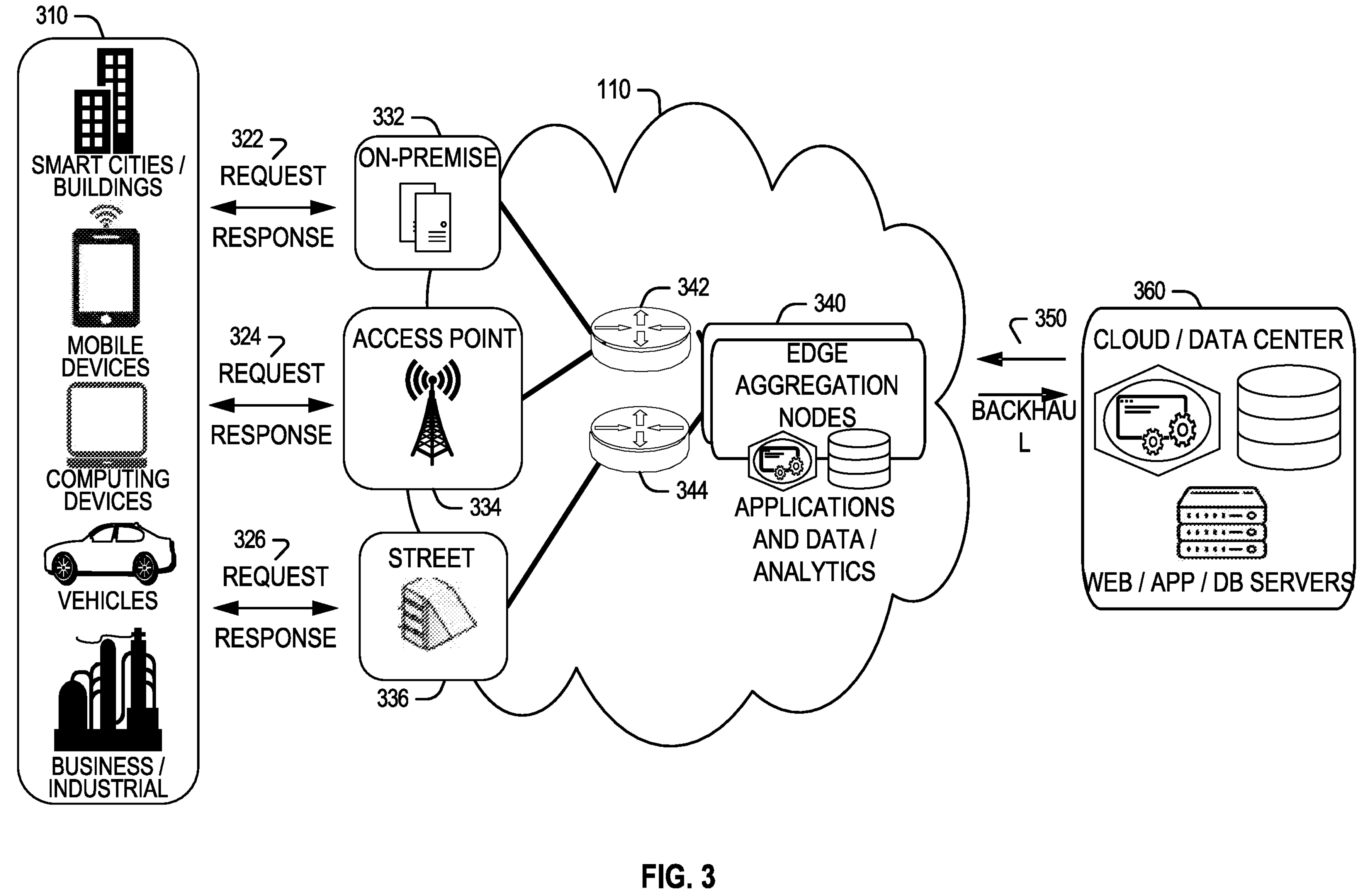
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., a cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
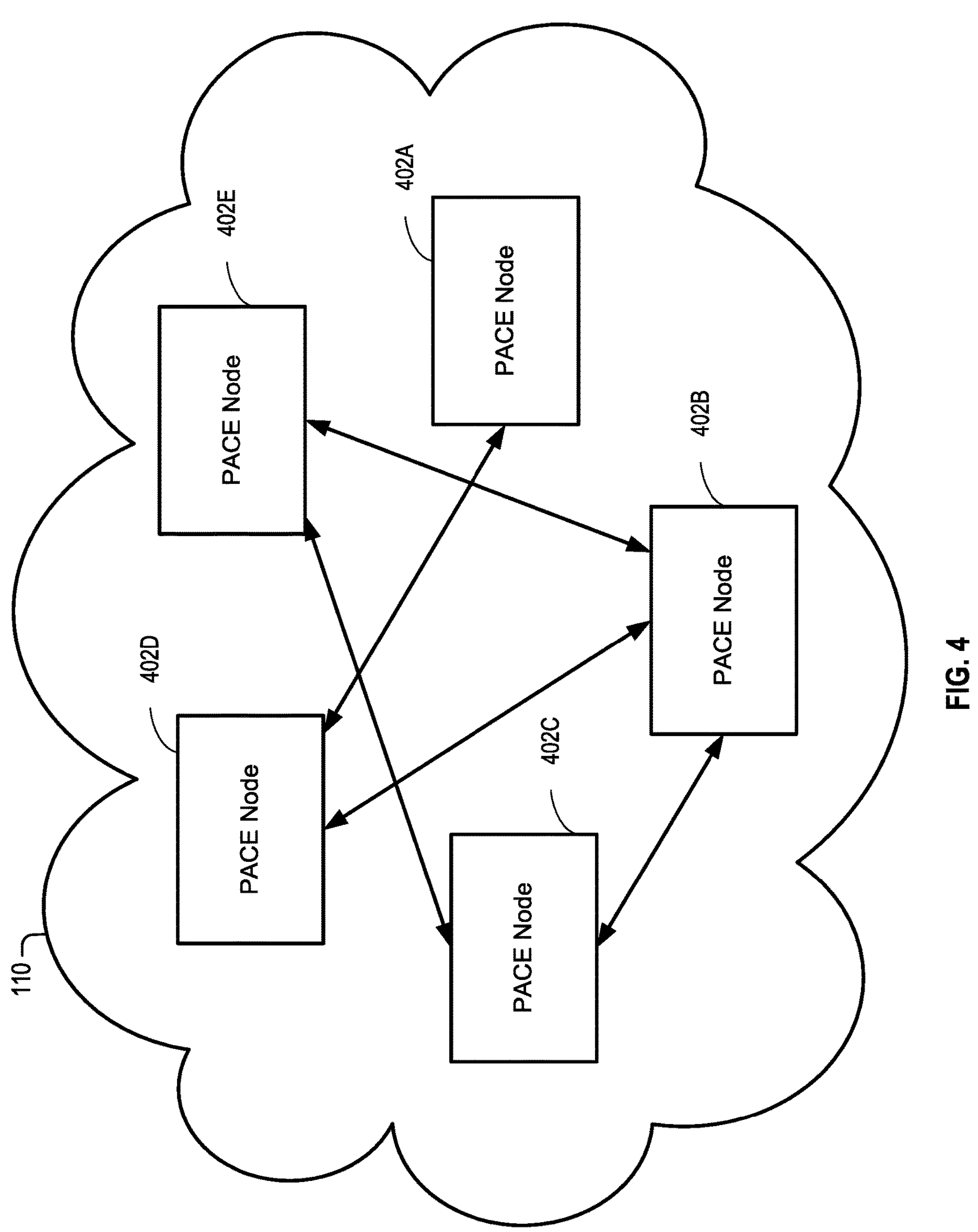
FIG. 4 is a block diagram of an example cluster of Policy-based Autonomous Cluster at the Edge (PACE) nodes in the edge cloud of FIG. 1.

FIG. 4 is an example block diagram of PACE nodes in the edge cloud of FIG. 1. The example of FIG. 4 includes the edge cloud 110 and example PACE nodes 402A, 402B, 402C, 402D, 402E, collectively referred to as PACE nodes 402. The PACE nodes 402 may additionally or alternatively be referred to as a cluster.

Each of the PACE nodes 402 is a compute device that implements the PACE architecture in accordance with the teachings of this disclosure. A given PACE node 402A may be implemented by any hardware components necessary to communicate with other PACE nodes, implement policies, and implement plug-ins. Hardware components that may be used to implement any of the PACE nodes 402 are discussed further in connection with FIGS. 5 and 25-28. The example of FIG. 4 shows five PACE nodes for simplicity. In practice, a cluster may include any number of PACE nodes, including a single node. Similarly, the example of FIG. 4 shows an arbitrary configuration of connections between the PACE nodes 402. In practice, a given PACE node may have any number of connections to other PACE nodes in same cluster. In some examples, a PACE node may refer to a compute node, a compute device, a work station, a wireless device, an endpoint, a network switch, etc.

The cluster of PACE nodes 402 interpret policy to coordinate actions. In some examples, the coordination of a cluster of PACE nodes 402 may be referred to as self-organizing, decentralized, non-centralized, independent, autonomous, etc., because the coordination occurs without input from devices outside of the cluster (e.g., a central entity). As used above and herein, a policy refers to a set of instructions that describes the roles, responsibilities, rights, authorizations, etc., of the PACE nodes 402 in a cluster. At the initial assignment of the workload, a given compute node can refer to a policy to determine its specific tasks.

To ensure each node in the cluster is using the same policy, the PACE nodes 402 communicate with one another to determine a consensus. As used herein, consensus refers to a shared decision by a plurality of compute nodes in a cluster that describes how the policy of the cluster should be interpreted. To determine a consensus, individual compute nodes may share their own telemetry data with other compute nodes in the cluster until a consistency of information is eventually reached (e.g., each compute node in the cluster has the same set of information). In some examples, the decentralized sharing of data within a cluster to reach consensus may be referred to as gossiping.

The PACE nodes 402 may use gossiping and eventual consistency to both interpret an existing policy and distribute new/updated policies to the cluster. The use of gossiping and eventual consistency enables the PACE nodes 402 to coordinate their actions without the help of a central entity. As a result, the PACE nodes 402 can collectively execute complex workloads at a lower cost than a cluster of edge devices managed by a central entity.

Figure 5:
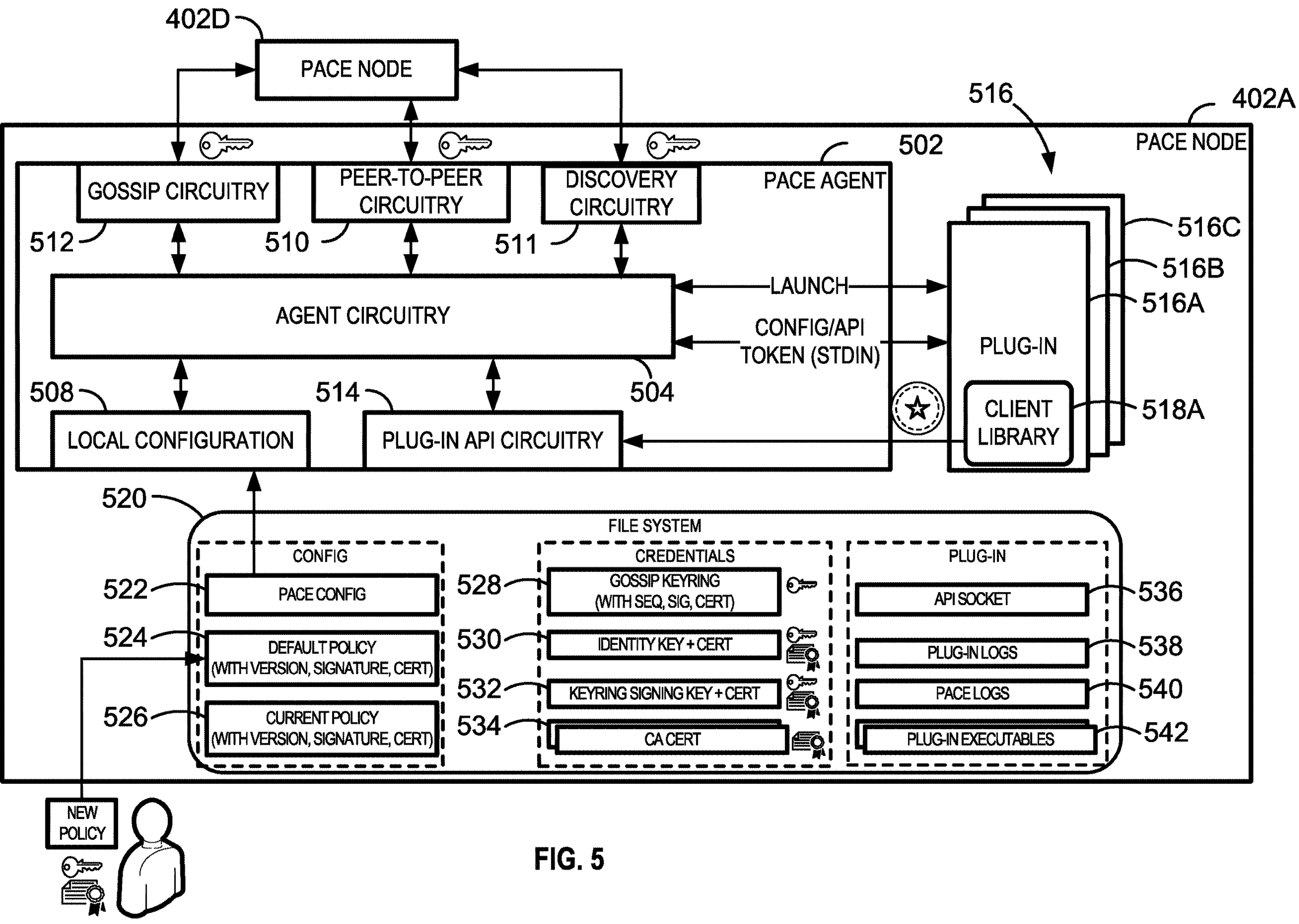
FIG. 5 is a block diagram of an example implementation of one of the PACE nodes of FIG. 4.

FIG. 5 is a block diagram of an example implementation of the PACE node 402A of FIG. 4. The PACE node of FIG. 5 may be instantiated (e.g., creating an instance of, bring into being for any length of time, materialize, implement, etc.) by programmable circuitry such as a Central Processor Unit (CPU) executing first instructions. Additionally or alternatively, the PACE node 402A of FIG. 5 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 5 may, thus, be instantiated at the same or different times. Some or all of the circuitry of FIG. 5 may be instantiated, for example, in one or more threads executing concurrently on hardware and/or in series on hardware. Moreover, in some examples, some or all of the circuitry of FIG. 5 may be implemented by microprocessor circuitry executing instructions and/or FPGA circuitry performing operations to implement one or more virtual machines and/or containers.

The example of FIG. 5 illustrates the PACE node 402A in communication with the PACE node 402D. The PACE node 402A includes an example PACE agent 502, which includes example agent circuitry 504, an example local configuration 508, example peer-to-peer (P2P) circuitry 510, example discovery circuitry 511, example gossip circuitry 512, and example plug-in Application Programming Interface (API) circuitry 514. The PACE node 402A additionally includes example plug-ins 516A, 516B, 516C, collectively referred to as example plug-ins 516, which contain corresponding example client libraries 518A, 518B, 518C. The PACE node 402A additionally includes example memory 520, which includes an example PACE configuration 522, an example default policy 524, an example current policy 526, am example gossip keyring 528, example identity credentials 530, example keyring credentials 532, example certificate authority (CA) certifications 534, an example API socket 536, am example plug-in log 538, an example PACE log 540, and example plug-in executables 542.

The PACE agent 502 communicates with the plug-ins 516, the memory 520, and other PACE nodes in the cluster to take actions. While the PACE node 402D is shown in FIG. 5 for simplicity, the PACE agent 502 may additionally communicate with any of PACE nodes 402B, 402C, 402E.

Within the PACE agent 502, the agent circuitry 504 determines what operations are to be implemented by the PACE node 402A. The operations may comprise a standalone workload, or be portion of a workload that is also implemented by one or more other PACE nodes in the cluster. In some examples, the agent circuitry 504 determines the PACE agent 502 should not perform operations. To determine whether to perform operations and, and to determine implementation details when operations should be performed, the agent circuitry 504 manages cluster membership, policies, plug-ins, and identities. The agent circuitry 504 also interprets policies, enables communication between plug-ins on different PACE nodes in the cluster, and rotates keys. The agent circuitry 504 is discussed further in connection with FIGS. 6-13. In some examples, the agent circuitry 504 is instantiated by programmable circuitry executing agent instructions and/or configured to perform operations such as those represented by the flowchart(s) of FIGS. 14-15.

The PACE agent 502 uses the local configuration 508 to determine parameters and settings used to execute a workload. The local configuration 508 may describe where to store data in the memory 520, which plug-ins to execute, when to rotate keyrings, etc.

Within the PACE agent 502, the P2P circuitry 510 enables the agent circuitry 504 to securely send and receive instructions to complete a task (e.g., procedures, subroutines, etc.) with other PACE nodes in the cluster. As described further below, the P2P circuitry 510 is used in operations including but not limited to identity verification, policy propagation, plug-in to plug-in communication, key rotation, etc. The P2P circuitry 510 may be implemented by any hardware components necessary to send and receive instructions to complete tasks. Example hardware components include but are not limited to e.g., transceivers, antennas, ports, etc. In some examples, the P2P circuitry 510 sends and receives data using an authenticated, remote procedure call (RPC) with Mutual Transport Layer Security (mTLS). In other examples, the P2P circuitry 510 sends and receives data with other communication and cryptographic protocols.

In some examples, before passing data along to other components of the PACE node 402A, the P2P circuitry 510 performs operations to verify that received transmissions are sent by trusted sources. Verification operations may include but are not limited to obtaining a verified certification chain from the CA certificates 534, interpreting the current policy 526 to establish the identity of the sender, and determining whether the identity is authorized to send communications with an RPC protocol. Example Examples of an identity include but are not limited to credentials, a token, a cryptographic function, a number, or any data structure that identifies a device. The port number of the P2P circuitry 510 may be dynamic unless specified as fixed in the local configuration 508. In some examples, the P2P circuitry 510 is instantiated by programmable circuitry executing P2P instructions and/or configured to perform operations such as those represented by the operations of FIGS. 7-15.

Within the PACE agent 502, the discovery circuitry 511 enables the agent circuitry 504 to discover other PACE nodes 402 in the cluster. Discovery of a node may refer to receiving an endpoint address that can be used to communicate with the new node using the gossip protocol. In examples described herein, the discovery circuitry 511 uses the Multicast Domain Name System (mDNS) protocol communicate with other PACE nodes 402. Because mDNS is multicast, any of the nodes 402 in the cluster can respond to a query transmitted by the discovery circuitry 511 in the PACE node 402A. In some examples, the discovery circuitry 511 uses a different communication protocol.

Within the PACE agent 502, the gossip circuitry 512 enables the agent circuitry 504 to share information with other PACE nodes in the cluster through a gossip protocol. The shared information may include but is not limited to node attributes, execution status, local configurations, P2P endpoint information (address and port), etc. The gossip protocol may be any protocol that enables state sharing amongst a dispersed network of notes. The agent circuitry 504 may also use the gossip circuitry 512 and the gossip cluster to discover new members of the cluster. The gossip circuitry 512 implements an encrypted gossip protocol that uses the gossip keyring 528. The port number of the gossip circuitry 512 may be dynamic unless specified as fixed in the local configuration 508. Messages sent over the gossip protocol are public so that they are visible by all nodes in the cluster. In some examples, the gossip circuitry 512 implements the gossip protocol using a connectionless UDP protocol that limits the length of a given message.

In some examples, the gossip circuitry 512 is instantiated by programmable circuitry executing gossip instructions and/or configured to perform operations such as those represented by the operations of FIGS. 7-15. In some examples, the gossip protocol used by the gossip circuitry and the RPC protocol used by the P2P circuitry 510 are referred to as in-band communication because they are the primary channels through which the PACE node 402A sends and receives data with external devices.

The plug-ins 516 refer to external software that may be written separately and independently of the design or manufacture of the PACE agent 502. Accordingly, the plug-in API circuitry 514 supports an API that provides a standardized interface to facilitate communication between the agent circuitry 504 and the plug-in 516. In some examples, the plug-in API circuitry 514 uses an authentication token and an encrypted communication channel to mitigate threats from malicious actors. In some examples, the plug-in API circuitry 514 is instantiated by programmable circuitry executing plug-in API instructions and/or configured to perform operations such as those represented by the operations of FIGS. 7-15.

In the illustrated example, one or more of the plug-ins 516 perform an action based on the interpretation of the policy by the agent circuitry 504. Examples of actions include but are not limited to execution of some or all of a workload, changing a configuration, triggering communication between one or more devices, a decision to execute operations or refrain from executing operations, etc. For example, each of the plug-ins 516 may use application specific logic to perform an action by executing a custom function, launching a service, etc. The plug-ins 516 may perform the actions based on local node attributes, attributes of other nodes in cluster, and communication with other plug-ins both internal and external to the PACE node 402A. While the example of FIG. 5 shows three plug-ins 516A, 516B, 516B for simplicity, a PACE node can have any number of plug-ins 516. In some examples, a plug-in 516A is referred to as a module.

Within a given plug-in 516A, the client library 518A is used to provide a language-specific binding that facilities the use of the plug-in API circuitry 514. In doing so, the client library 518A abstracts interactions between the plug-in 516A and the PACE agent 502.

The memory 520 stores data used by the PACE agent 502 and the plug-ins 516 to communicate with one another, communicate with other PACE nodes, and perform operations. The memory 520 is implemented by any memory, storage device and/or storage disc for storing data such as, for example, flash memory, magnetic media, optical media, solid state memory, hard drive(s), thumb drive(s), etc. Furthermore, the data stored in the memory 520 may be in any data format such as, for example, binary data, comma delimited data, tab delimited data, structured query language (SQL) structures, Extensible Markup Language (XML), JavaScript Object Notation (JSON), YAML Ain't Markup Language (YAML), etc. While, in the illustrated example, the memory 520 is illustrated as a single device, the memory 520 and/or any other data storage devices described herein may be implemented by any number and/or type(s) of memories.

Within the memory 520, the PACE configuration 522 refers to a generalized set of parameters and settings that may be used by any PACE node. In some examples, the local configuration 508 is a modified version of the PACE configuration 522.

Within the memory 520, the default policy 524 refers to a policy used by the PACE agent 502 when no other policy is present. Similarly, the memory 520, the current policy 526 refers to the policy refers to the policy currently being used by the PACE agent 502. While the memory 520 may initially store a pre-determined default policy 524, a verified source can update, modify, or replace the default policy 524 based on the needs of a specific use case.

The PACE agent 502 determines whether the current policy 526 is the default policy 524 or a custom policy by achieving eventual consensus with the other PACE nodes in the cluster via the gossip circuitry 512. The default policy 524 and the current policy 526 include version information, a signature, and a certification.

Within the memory 520, the gossip keyring 528 refers to a set of encryption keys, signatures, and certificates used to authenticate messages transmitted by the agent circuitry 504 via the gossip circuitry 512. The gossip keyring 528 is described further in connection with FIG. 10.

Within the memory 520, the identity credentials 530 refers to data structures used to prove to other nodes that the PACE node 402A is the true sender or receiver of a message. The identity credentials 530 include an encryption key and a certificate.

Within the memory 520, the keyring credentials 532 refer to a signing key and certificate that may be used by the agent circuitry 504 to rotate the gossip keyring 528. The keyring credentials 532 is discussed further in connection with FIG. 10.

Within the memory 520, the CA certifications 534 refers to certificate data structures provided to the PACE node 402A by a CA, which is a trusted source external from the cluster of PACE nodes 402. The memory 520 may store any number of CA certifications 534.

Within the memory 520, the API socket 536 provides a software endpoint used to enable bi-directional, full-duplex communication between the plug-in API circuitry 514 and the plug-ins 516.

Within the memory 520, the plug-in log 538 refers to the recordation of events related to the plug-ins 516. Similarly, the PACE log 540 refers to recordation of events related to the PACE agent 502. Both the plug-in log 538 and the PACE log 540 may include data including but not limited to usage patterns, activities, errors, warning, etc.

Within the memory 520, the plug-in executables 542 are one or more files or programs that are executed by programmable circuitry on the PACE node 402A to implement a corresponding number of plug-ins 516. The plug-in executables 542 may be third party files that are developed separately from the design and manufacture of the PACE node.

FIG. 5 illustrates how the PACE nodes 402 perform workloads in a decentralized and autonomous manner. The PACE agent 502 obtains, manages, and interprets policies to determine the relationship of the PACE node 402A relative to the other PACE nodes in the cluster. The PACE agent 502 then communicates with one or more of the plug-ins 516, which use application-specific functionality to execute a particular portion(s) of the workload based on a result of the policy interpretation. The use of the PACE agent and plug-in architecture in accordance with the teachings of this disclosure can allow for greater scalability, security, flexibility, and cost savings than edge devices that coordinate operations based on a central entity.

In some examples, the PACE nodes 402 include means for managing policy. For example, the means for managing policy may be implemented by agent circuitry 504. In some examples, the agent circuitry 504 may be instantiated by programmable circuitry such as the example programmable circuitry 2512 of FIG. 25. For instance, the agent circuitry 504 may be instantiated by the example microprocessor 2600 of FIG. 26 executing machine executable instructions such as those described in FIGS. 7-15. In some examples, the agent circuitry 504 may be instantiated by hardware logic circuitry, which may be implemented by an ASIC, XPU, or the FPGA circuitry 2700 of FIG. 27 configured and/or structured to perform operations corresponding to the machine readable instructions. Additionally or alternatively, the agent circuitry 504 may be instantiated by any other combination of hardware, software, and/or firmware. For example, the agent circuitry 504 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the PACE nodes 402 includes means for communicating with an RPC. For example, the means for communicating within an RPC may be implemented by P2P circuitry 510. In some examples, the P2P circuitry 510 may be instantiated by programmable circuitry such as the example programmable circuitry 2512 of FIG. 25. For instance, the P2P circuitry 510 may be instantiated by the example microprocessor 2600 of FIG. 26 executing machine executable instructions such as those described in FIGS. 7-15. In some examples, the P2P circuitry 510 may be instantiated by hardware logic circuitry, which may be implemented by an ASIC, XPU, or the FPGA circuitry 2700 of FIG. 27 configured and/or structured to perform operations corresponding to the machine readable instructions. Additionally or alternatively, the P2P circuitry 510 may be instantiated by any other combination of hardware, software, and/or firmware. For example, the P2P circuitry 510 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the PACE nodes 402 include means for gossiping. For example, the means for gossiping may be implemented by gossip circuitry 512. In some examples, the gossip circuitry 512 may be instantiated by programmable circuitry such as the example programmable circuitry 2512 of FIG. 25. For instance, the gossip circuitry 512 may be instantiated by the example microprocessor 2600 of FIG. 26 executing machine executable instructions such as those described in FIGS. 7-15 In some examples, the gossip circuitry 512 may be instantiated by hardware logic circuitry, which may be implemented by an ASIC, XPU, or the FPGA circuitry 2700 of FIG. 27 configured and/or structured to perform operations corresponding to the machine readable instructions. Additionally or alternatively, the gossip circuitry 512 may be instantiated by any other combination of hardware, software, and/or firmware. For example, the gossip circuitry 512 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the PACE nodes 402 includes means for communicating with an API. For example, the communicating with an API may be implemented by plug-in API circuitry 514. In some examples, the plug-in API circuitry 514 may be instantiated by programmable circuitry such as the example programmable circuitry 2512 of FIG. 25. For instance, the plug-in API circuitry 514 may be instantiated by the example microprocessor 2600 of FIG. 26 executing machine executable instructions such as those described in FIGS. 7-15. In some examples, the plug-in API circuitry 514 may be instantiated by hardware logic circuitry, which may be implemented by an ASIC, XPU, or the FPGA circuitry 2700 of FIG. 27 configured and/or structured to perform operations corresponding to the machine readable instructions. Additionally or alternatively, the plug-in API circuitry 514 may be instantiated by any other combination of hardware, software, and/or firmware. For example, the plug-in API circuitry 514 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Figure 6:
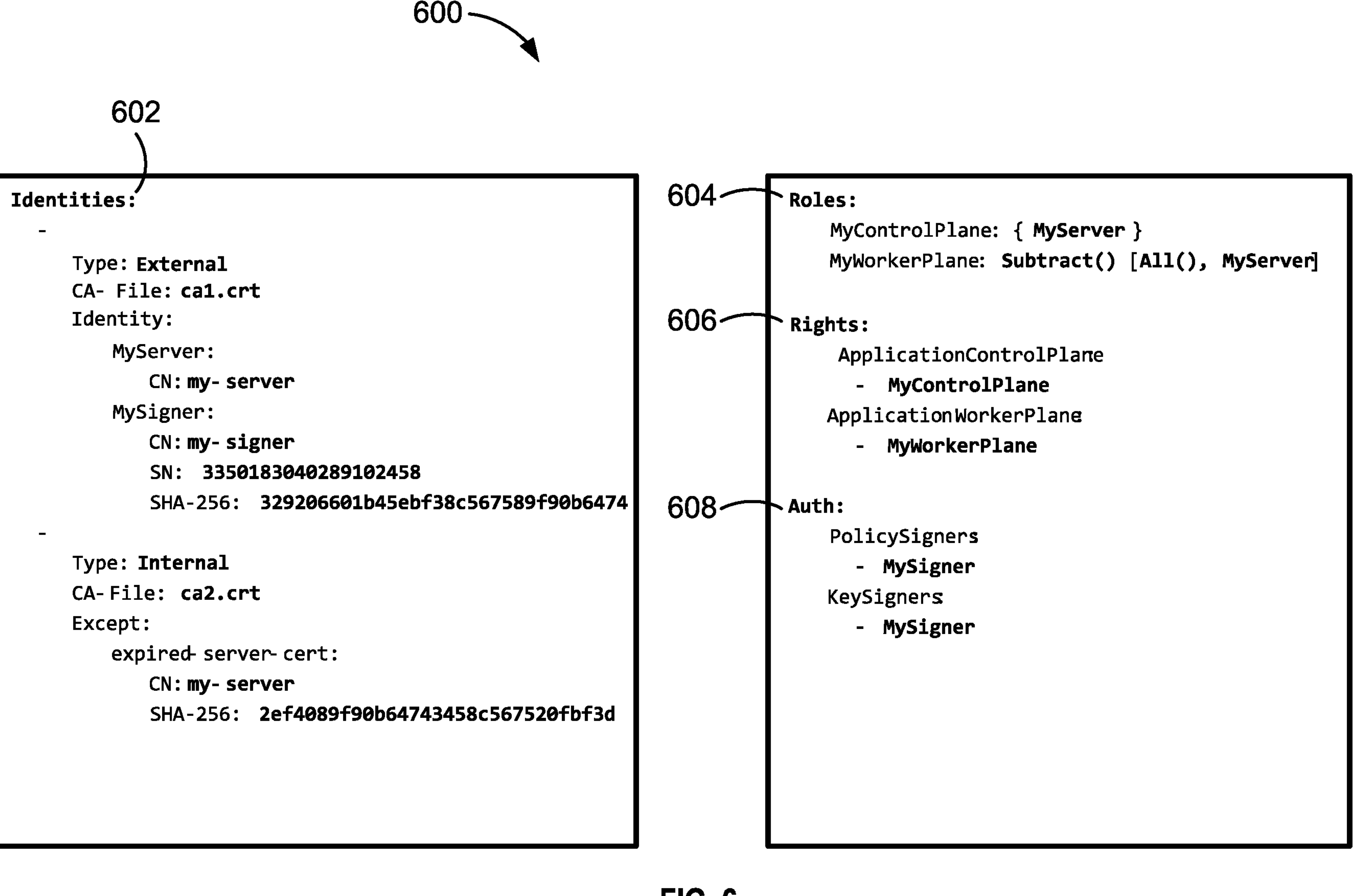
FIG. 6 illustrates an example policy utilized by the PACE node of FIG. 5.

FIG. 6 is an example implementation of the policy of FIG. 5. The example of FIG. 6 shows a policy 600 that includes an identities section 602, a roles section 604, a rights section 606, and an authorization section 608.

In some examples, a policy is a human-readable file (e.g., a YAML definition) describing what each of the PACE nodes 402 that form a cluster should do to complete a workload. The policy 600 is an example implementation of a policy implemented by the PACE nodes 402 of FIG. 4. The policy

600 may implement the default policy 524, the current policy 526, and/or a separate policy stored in memory 520.

In the illustrated example, the identities section 602 matches the credentials of the PACE node 402A to an identity in the policy. The structure of the identities section 602 is comprised of a list of one or more blocks. Each block represents a specific CA, and the identities that are associated with a credential issued by that CA. Each block includes a list of identities, each with a specified handle and associated credential characteristics to match. Examples of credential characteristics include but are not limited to credential's Common Name (CN), Serial Number (SN), or Secure Hash Algorithm 256 (SHA-256), etc.

In the illustrated example, each identity block has a type that is either Internal or External. Internal blocks are associated with CAs that are intended to create identities only for PACE. Thus, any credential that is issued by an internal CA is accepted as an identity, unless it is explicitly excluded in the identity block. If there is not a specifically matching identity in the block, the credential is implicitly matched to an identity named by the Common Name (CN) of the credential. External blocks are associated with CAs that create credentials for many uses. Credentials from an external block may only be accepted if they explicitly match an entry in the block. As an example, the identities section 602 includes two identities from a CA whose certificate is in the file ca1.crt as part of the cluster of FIG. 4. In addition, any certificate from a CA whose certificate is in the file ca2.crt are also part of the cluster, except the certificate listed in the "Except" section.

In the illustrated example, the roles section 604 of the policy 600 includes one or more roles. In turn, a role is used to generate a list of zero or more identities. Members of a role may be specified as an explicit list in the policy, they may be defined based on the members of other roles, or they may be determined dynamically by executing a function named in the policy. As an example, the roles section 604 includes a MyControlPlane role and a MyWorkerPlane role. The MyControlPlane role includes only the MyServer identity defined in the identities section 602. The MyWorkerPlane may dynamically include multiple identities as defined by the function call Subtract( ). Function calls that may be used by the PACE agent 502 to determine a role include but are not limited to the following:

| Function Name | Description |
|---|---|
| ALL | Returns the identities of all nodes in the cluster |
| SUBTRACT | Returns the nodes from one list, minus the nodes in another list |
| PICKN | Returns a deterministic, ordered list of N node identities from the set of all nodes, or from another role |
| SELECTNTH | Select the Nth node identity from a deterministic, ordered list |
| THRESHOLD | Select the first N node identities from a deterministic, ordered list, where N is dependent on the number of nodes in the cluster. |
| UNION | Returns the union of the identities from all the specified roles. |
| INTER-SECTION | Returns the intersection of the identities from all the specified roles. |
| OR | Returns the first non-empty list of nodes from a set of lists of nodes |

In the illustrated example, the MyWorkerPlane role in the roles section 604 includes all identities used within the cluster except the MyServer identity.

While the above functions are provided by the PACE Agent 502 itself, a plug-in 516A can define additional functions that may be utilized by the policy. When interpreting the policy, the PACE agent 502 will call the plug-in 516A via the Plug-In API Circuitry 514 to execute the function.

In the illustrated example, the rights section 606 of the policy 600 includes one or more rights. In turn, a right is a list of one or more roles. For example, the rights section 606 includes an ApplicationControlPlane right and an ApplicationWorkerPlane right. The ApplicationControlPlane right is composed of the subset of PACE nodes 402 who have the identities included in the MyControlPlane role, while the ApplicationWorkerPlane is composed of the subset of PACE nodes 402 who have the identities included in the MyWorkerPlane role. The plug-ins 516 use rights to perform actions on a given PACE node.

In the illustrated example, an authorization section 608 of the policy 600 authorizes nodes belonging to a particular identity to perform specific actions. For example, the authorization section 608 authorizes nodes with the identity MySigner to both sign policies and rotate keys.

The interpretation of a policy is deterministic in that a cluster executing the same policy with the same eventually consistent view of the cluster members (e.g., the PACE nodes 402) and their characteristics (via the gossip protocol) will assign the same nodes to the same rights. That is, if the PACE nodes 402 all determine to use the policy 600 through consensus, then the credentials stored in the memory 520 of the PACE node 402A determine whether the PACE node 402A has ApplicationControlPlane rights (therefore causing one or more of the plug-ins 516 to perform operations based on the MyServer identity) or ApplicationWorkerPlane rights (therefore causing one or more of the plug-ins 516 to perform operations based on all identities but MyServer).

The PACE nodes 402 can use the gossip circuitry 512 to share unique characteristics of the heterogeneous nodes in the cluster, thereby enabling the cluster to determine roles and rights based on the characteristics through policy interpretation. For example, a PACE distributed policy may cause a FPGA compute node (e.g. PACE node 402A) to be a member of a first role instead of a GPU compute node (e.g., PACE node 402B) if the first role is most efficient when executed on an FPGA. Furthermore, PACE enables hyperconnectivity in that a given node is not limited to a single role. The rights obtained by the PACE node 402A may cause the PACE node 402A to add, remove, or change roles throughout the execution of a workload. In some examples, the deterministic interpretation of the policy causes one or more PACE nodes within the cluster to implement their application specific tasks independently. Additionally or alternatively, the interpretation of the policy may cause one or more PACE nodes within the cluster to implement their application specific tasks in a dependent manner (e.g., PACE node 402A will wait to perform a first task until PACE node 402D has completed a second task and notified PACE node 402A).

Figure 7:
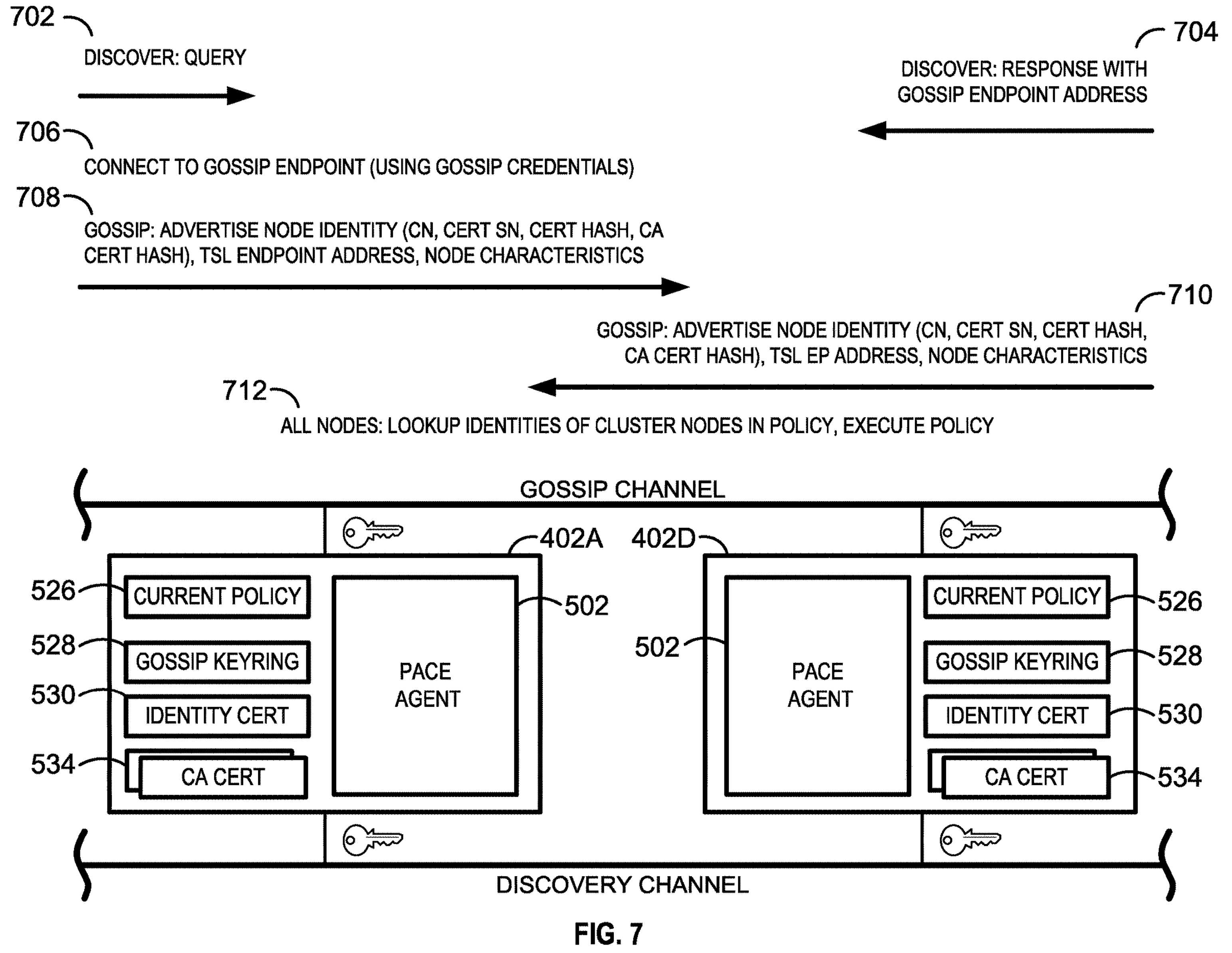
FIG. 7 is an example implementation of a new PACE node joining the cluster of PACE nodes of FIG. 4.

FIG. 7 is an example implementation of a new PACE node joining the cluster of existing PACE nodes of FIG. 4. The example of FIG. 7 includes PACE nodes 402A, 402D, and operations 702, 704, 706, 708, 710, 712.

In the example of FIG. 7, the PACE node 402A is a new device that is joining a pre-existing cluster of nodes formed by PACE nodes 402B, 402C, 402D, 402E. In both FIG. 4 and FIG. 7, the PACE node 402A joins the cluster through a direct connection to PACE node 402B. The illustrative example of FIG. 7 shows only a subset of the internal components of a PACE node for simplicity. In practice, both PACE nodes 402A and 402D are implemented as described above in connection with FIG. 5.

The PACE node 402A may receive updates to policies through in-band communication (e.g., via the gossip circuitry 512 or P2P circuitry 510). Before joining cluster, the PACE node 402A may receive the current policy 526 through out of band communication. The out of band communication may include, but is not limited to, storage of the data in memory at the time of manufacture, transmission via a Fast Identity Online (FIDO) Device on Board (FDO) protocol, or transmission via an Encapsulating Security Payload (ESP) protocol. Similarly, the PACE node 402A may obtain a gossip keyring 528, the identity credentials 530, and one or more CA credentials 534 through out of band communication.

In the operation 702, the discovery circuitry 511 in the PACE node 402A transmits a query to the PACE node 402D. The query is a request to join the pre-existing cluster of PACE nodes 402B, 402C, 402D, 402E.

In the operation 704, the discovery circuitry 511 in the PACE node 402D transmits a response to the query to the PACE node 402A. The query includes a gossip endpoint address. Accordingly, in the operation 706, the PACE node 402A uses the gossip endpoint address and the gossip keyring 528 to join the gossip protocol used by the cluster.

Once connected, the gossip circuitry 512 in the PACE node 402A advertises the identity of the PACE node 402A to the PACE node 402D at the operation 708. In examples where the PACE node 402A has a direct connection to other nodes in the cluster, the operation 708 may additionally include the advertising of the identity to the other nodes via the gossip circuitry 512. The advertisement of a node identity can include but is not limited to credentials obtained by the node (e.g., CNs, SNs, hash values, CA certificates, etc.), a TLS Endpoint address, node characteristics, etc. The gossip circuitry 512 in both PACE nodes 402A, 402D use a key from the gossip keyring 528 to encrypt and decrypt, respectively, the node advertisement of operation 708.

In the operation 710, the gossip circuitry 512 in the PACE node 402D advertises the identities of all nodes known to the PACE node 402D within the cluster to the PACE node 402A. In examples where the PACE node 402A has a direct connection to other nodes in the cluster, the operation 710 may additionally include the PACE node 402A receiving node identity advertisements to the other nodes via the gossip circuitry 512. Through the one or more communications represented by each of the operations 708 and 710, the cluster gains eventual consistency. That is, each pre-existing node in the cluster eventually learns the identity of the PACE node 402A and the PACE node 402A eventually learns the identities of each pre-existing node in the cluster. Like the operation 708, advertisement messages represented by the operation 710 use a key from the gossip keyring 528 for both encryption and decryption purposes.

In the operation 712, the nodes in the cluster, including the PACE node 402A, use the current policy 526 to determine the rights of each node and execute the policy based on those rights. The execution of the policy may result in nodes performing tasks independently or dependently as described above. In some examples, the plug-in 516A of PACE node 402A performs a first task independently in parallel with the plug-in 516B that performs a second task dependently. For example, the plug-in 516B of node 402A may wait to perform the second task until it receives approval from the plug-in 516B of PACE node 402D.

FIG. 7 shows how a PACE node can join a cluster of other PACE nodes in a decentralized and autonomous manner. The use of a deterministic policy enables the PACE nodes to add or remove rights based on the characteristics of the cluster. For example, suppose the PACE node 402D may execute operations based on a first right defined within the policy before the addition of the PACE node 402A. The PACE node 402D may switch to execute operations based on the second right defined within the policy after the PACE node 402A joins because the PACE node 402A can implement the first right more efficiently.

The switch of PACE node 402D from the first right to the second right is a deterministic result of interpreting the policy, given the fact that the PACE node 402A is now present. Because each node in the cluster gossips to use the same policy and learn about the presence of the PACE node 402A, each node can interpret the policy to determine the same result (that PACE node 402D is switching rights) without a central entity needing to obtain and distribute said information. Accordingly, a cluster of PACE nodes can use the policy to autonomously change rights when a new device joins the cluster, thereby improving the efficiency of the workload execution.

Figure 8:
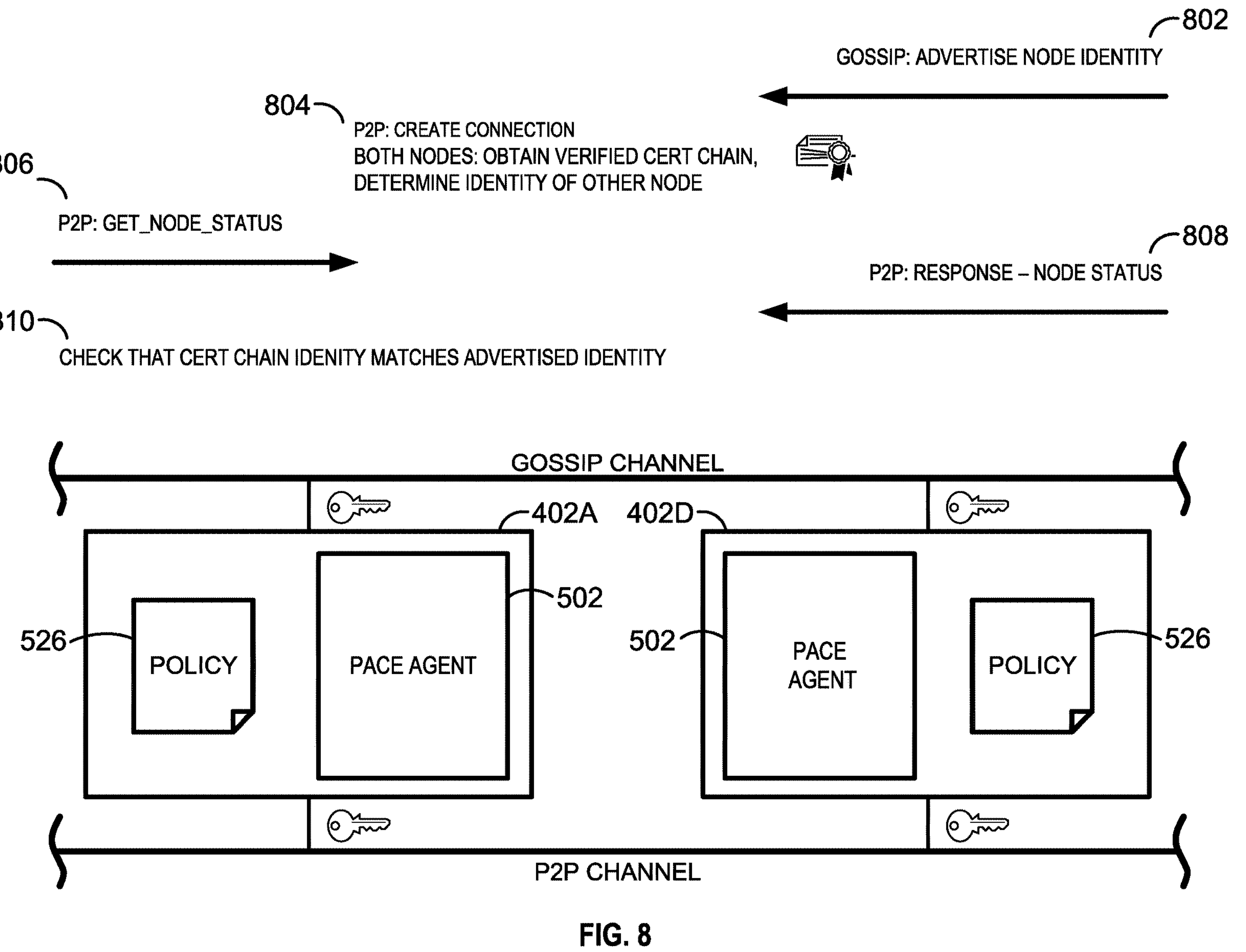
FIG. 8 is an example implementation of node verification within the cluster of PACE nodes of FIG. 4.

FIG. 8 is an example implementation of node verification within the cluster of PACE nodes of FIG. 4. The example of FIG. 8 shows the PACE nodes 402A, 402D with only the PACE agent 502 and current policy 526 for simplicity. In practice, the PACE nodes 402A and 402D are implemented as described above in connection with FIG. 5. The example of FIG. 10 also includes operations 802, 804, 806, 808, 810.

In the operations 802, the PACE node 402D advertises identity information via the gossip circuitry 512 and the gossip protocol. The advertisement of a node identity can include but is not limited to credentials obtained by the node (e.g., CNs, SNs, hash values, CA certificates, etc.), a TLS Endpoint Protocol address, node characteristics, etc.

In the operations 804, PACE node 402A makes a P2P connection to PACE node 402D. As a result of mutual authentication, both the PACE node 402A and the PACE node 402D obtain a verified certificate chain from the CA certificates 534. PACE node 402A uses a verified certificate chain to verify that PACE node 402D possesses the private key associated with the provided certificate and that the certificate for PACE node 402D has been signed by a particular CA. The verification enables the PACE node 402A to match the characteristics of that particular CA and the certificate for node 402D to the policy, thereby verifying the identity of node 402D. Similarly, the PACE node 402D verifies the identity of PACE node 402A by identifying a particular CA that has signed the certificate for PACE node 402A and checking the policy for the characteristics of the particular CA and the certificate for node 402A.

In the operations 806, the PACE node 402A transmits a request, via the RPC protocol and the P2P circuitry 510, to the PACE node 402D for node status. In the operations 808, the PACE node 402D responds to the request by transmitting, using the RPC protocol and the P2P circuitry 510, node status information. The node status information may include but is not limited to the cluster name, TLS Endpoint (EP) addresses, the identity of the PACE node 402D, one or more attributes of the PACE node 402D, etc.

In the operations 810, the PACE node 402A checks the certification and node information received in the P2P response matches the corresponding information received in the gossip advertisement. The PACE node 402A can use the verified certification and node information of the P2P response (which is authenticated using mTLS) to verify that the PACE node 402D possesses the identity it claims to have in gossip advertisement of operations 802. Therefore, if the PACE node 402D shares additional information via the gossip protocol using the same identity, the PACE node 402A knows the additional information can be trusted.

The foregoing verification procedure also prevents a malicious device from pretending, with a shared key used in the gossip protocol, to have the identity of a trusted device. PACE prevents such identity masking because the identity of a node is based on a node-specific key. In examples where a new PACE node joins a cluster of pre-existing PACE nodes, the existing PACE node(s) may verify the new node as described above in connection with FIG. 8 before re-interpreting or executing policy (e.g., before operations 712).

Figure 9:
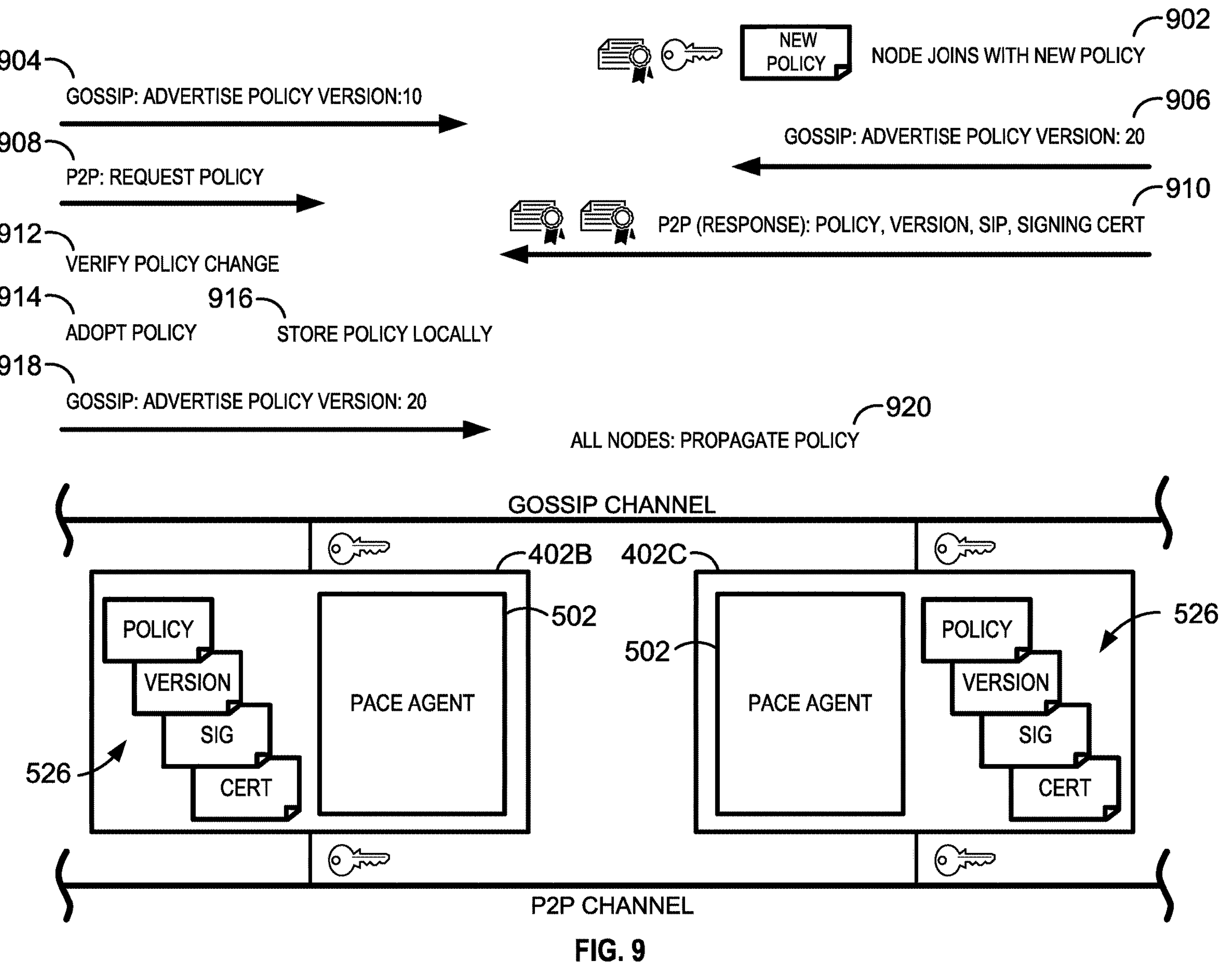
FIG. 9 is an example implementation of policy propagation within the cluster of PACE nodes of FIG. 4.

FIG. 9 is an example implementation of policy propagation within the cluster of PACE nodes of FIG. 4. The example of FIG. 9 shows the PACE nodes 402B, 402C with only the PACE agent 502 and current policy 526 (including version, signatures, and certifications) for simplicity. In practice, the PACE nodes 402B and 402C are implemented as described above in connection with FIG. 5. The example of FIG. 9 includes PACE nodes 402B, 402C, and operations 902, 904, 906, 908, 910, 912, 914, 916, 918, 920.

In the example of FIG. 9, the PACE node 402C is a new device that is joining a pre-existing cluster of nodes formed by PACE nodes 402A, 402B, 402D, 402E. In operation 902, the PACE node 402C joins the cluster as described above in connection with FIG. 7. In the example of FIG. 9, the PACE node 402C has an updated version of the policy as compared with the pre-existing nodes in the cluster. The updated policy is signed using a key and/or certificate by an entity authorized to sign policies.

In operation 904, the gossip circuitry 512 of the PACE node 402B advertises the version of its current policy. In the illustrative example of FIG. 9, the older version of the policy used by the pre-existing node members is represented as version 10, while the newer version of the policy introduced by the PACE node 402C is represented as version 20. In some examples, the PACE node 402B performs the operation 904 in response to the PACE node 402C joining the cluster.

The PACE node 402C receives the advertisement and determines the PACE node 402B is using an outdated policy version number. In the operation 906, the PACE node 402C advertises the version of its current policy, via the gossip circuitry 512, the newer policy version (e.g., version 20). In some embodiments, operation 904 and 906 occur independently, asynchronously, and possibly simultaneously.

The PACE node 402B receives the advertisement of operation 906 and determines it is using an outdated policy. As a result, the PACE node 402B performs operations 908 by transmitting a request to the PACE node 402C for the new policy. The request of operations 908 are transmitted via the P2P circuitry 510 using a key from the identity credentials 530.

In the operation 910, the PACE node 402C provides the requested policy and associated data to the PACE node 402B via the P2P circuitry 510. In particular, the operation 910 includes the PACE node 402C transmitting the of the file for the current policy 526, the policy version (e.g., version 20), a policy signature, and a signing certificate. The policy signature refers to the output of an algorithm that produces a unique data structure based on the identity credentials 530 of the PACE node 402C, the policy file, and the version number. The transmissions in the operations 910 are transmitted via the P2P circuitry 510 using a key from the identity credentials 530.

Upon receiving the transmissions of the operations 910, the PACE node 402B first performs operations 912 to verify the policy change. Verification of the policy change may include but is not limited to verifying the received policy is newer than the current policy, verifying the policy signature, looking up the identity of the policy signer in the current policy, and verifying that the identity identified during look-up is authorized to update the policy.

After verifying the policy during the operations 912, the PACE node 402B adopts the received policy during the operations 914. To adopt the policy, the PACE node 402B may determine rights and begin performing tasks based on said rights. The PACE node 402B also stores the received policy locally in memory 520 during the operations 916.

In the operations 918, the gossip circuitry 512 of the PACE node 402B advertises the new policy (e.g., version 20) to other connected devices. Over the course of operations 920, advertisements for the new policy reach each of the PACE nodes 402, and the cluster re-gains consistency by adopting policy version 20.

Figure 10:
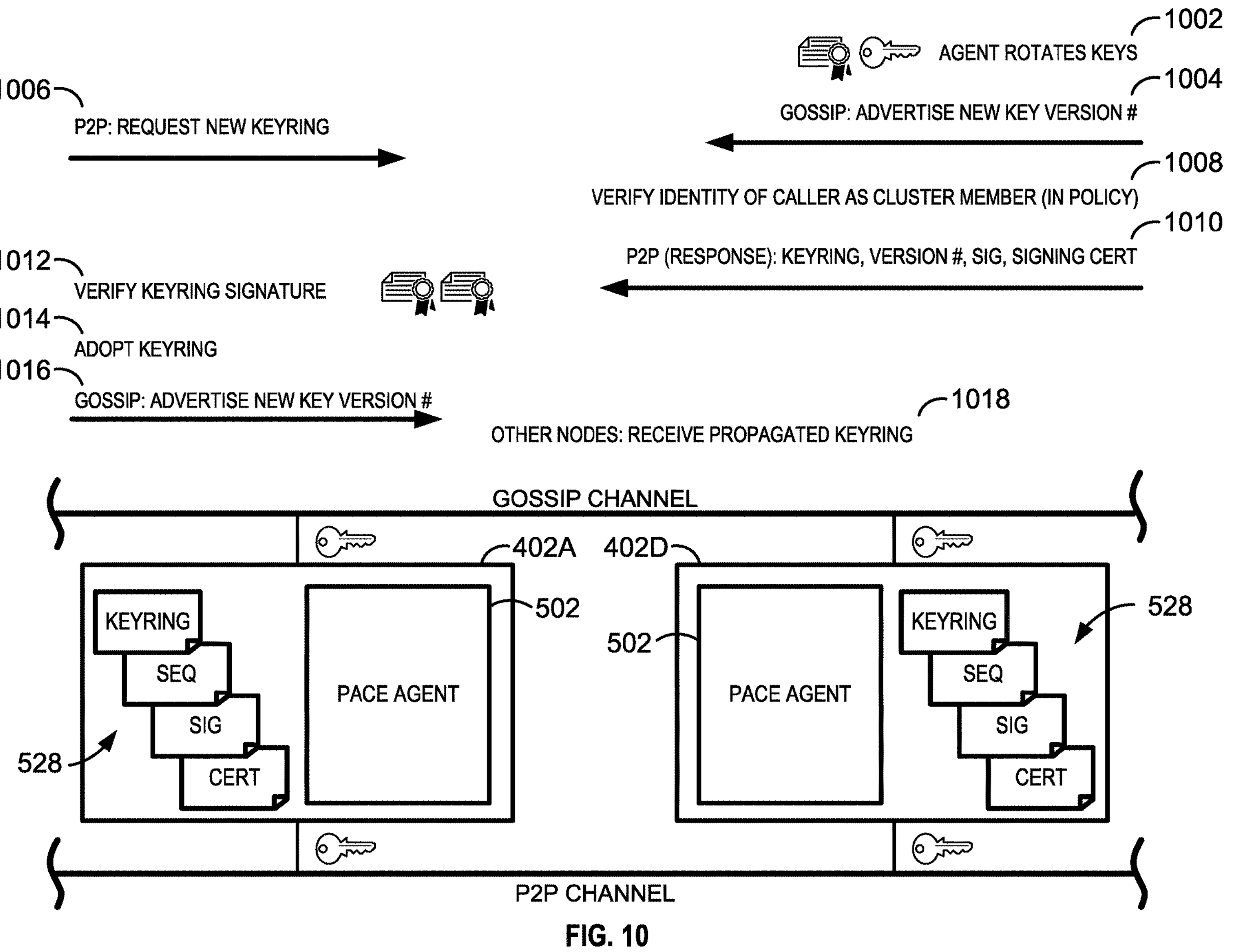
FIG. 10 is an example implementation of key rotation within the cluster of PACE nodes of FIG. 4.

FIG. 10 is an example implementation of key rotation within the cluster of PACE nodes of FIG. 4. The example of FIG. 10 shows the PACE nodes 402A, 402D with only the PACE agent 502 and example gossip keyring 528 for simplicity. In practice, the PACE nodes 402A and 402D are implemented as described above in connection with FIG. 5. FIG. 10 also includes operations 1002, 1004, 1006, 1008, 1010, 1012, 1014, 1016, and 1018.

The gossip keyring 528 includes a set of keys held by each device in the cluster that communicates using the gossip protocol. The set of keys includes a subset of future encryption keys, a subset of past encryption keys, and a current encryption key. At any point in time, any device seeking to communicate using the gossip protocol is required to encrypt the message with the current encryption key.

The current encryption key changes over time to protect against malicious actors. In some examples, the current encryption key changes at a regular interval. In other examples, the current encryption key changes when a node with a key-changing right determines the keys should be changed.

The changing of gossip key begins with the operations 1002, where the PACE node 402D rotates the gossip keyring 528. To rotate the gossip keyring 528, the PACE node 402D adds a new key to the subset of future keys, re-assigns the oldest future key to be the current key, re-assigns what was the current key to be a past key, and removes/writes over the oldest past key. The PACE node 402D also increments the version number and signs the updated gossip keyring 528.

In the operations 1004, the PACE node 402D advertises the new version number of the gossip keyring 528 using the gossip circuitry 512 and the gossip protocol. The PACE node 402A receives the advertisement.

In response to the advertisement, the PACE node 402A implements operations 1006 by requesting a new keyring from the PACE node 402D. The request is transmitted over the P2P circuitry 510 using the RPC protocol. In turn, the PACE node 402D performs operations 1008 by interpreting the current policy 526 to verify the transmitter of the request is a member of the cluster.

After verifying the transmitter of the request, the PACE node 402D performs operations 1010 by providing a response via the P2P circuitry 510 and the RPC protocol. The response includes the updated set of keys, the version number, the signature, and a signing certificate. In some examples, the version number is referred to as a sequence number.

In the operations 1012, the PACE node 402A verifies the keyring signature within the P2P response. The verification of operations 1012 include a certificate from the keyring credentials 532 and/or a CA certificate 534.

In operations 1014, the PACE node 402A adopts the keyring within the P2P response. To adopt the keychain, the PACE node 402A first stores the updated set of keys in memory 520, thereby updating the gossip keyring 528. The PACE node 402A then configures the gossip protocol to use the updated gossip keyring 528.

In operations 1016, the PACE node 402A advertises, using the gossip circuitry 512 and the gossip protocol, the new version number of the gossip keyring 528. The new version number is received by any devices in the cluster. Similarly, in operations 1004 the advertisement by the PACE node 402D responsible for rotating the keyring is received by any devices in the cluster. The receipt of a new version number causes the other nodes to request the new keyring from the advertising node (as described above in connection with operations 1006). in operations 1018 the new keyring is propagated to all PACE nodes 402 within the cluster.

Figure 11:
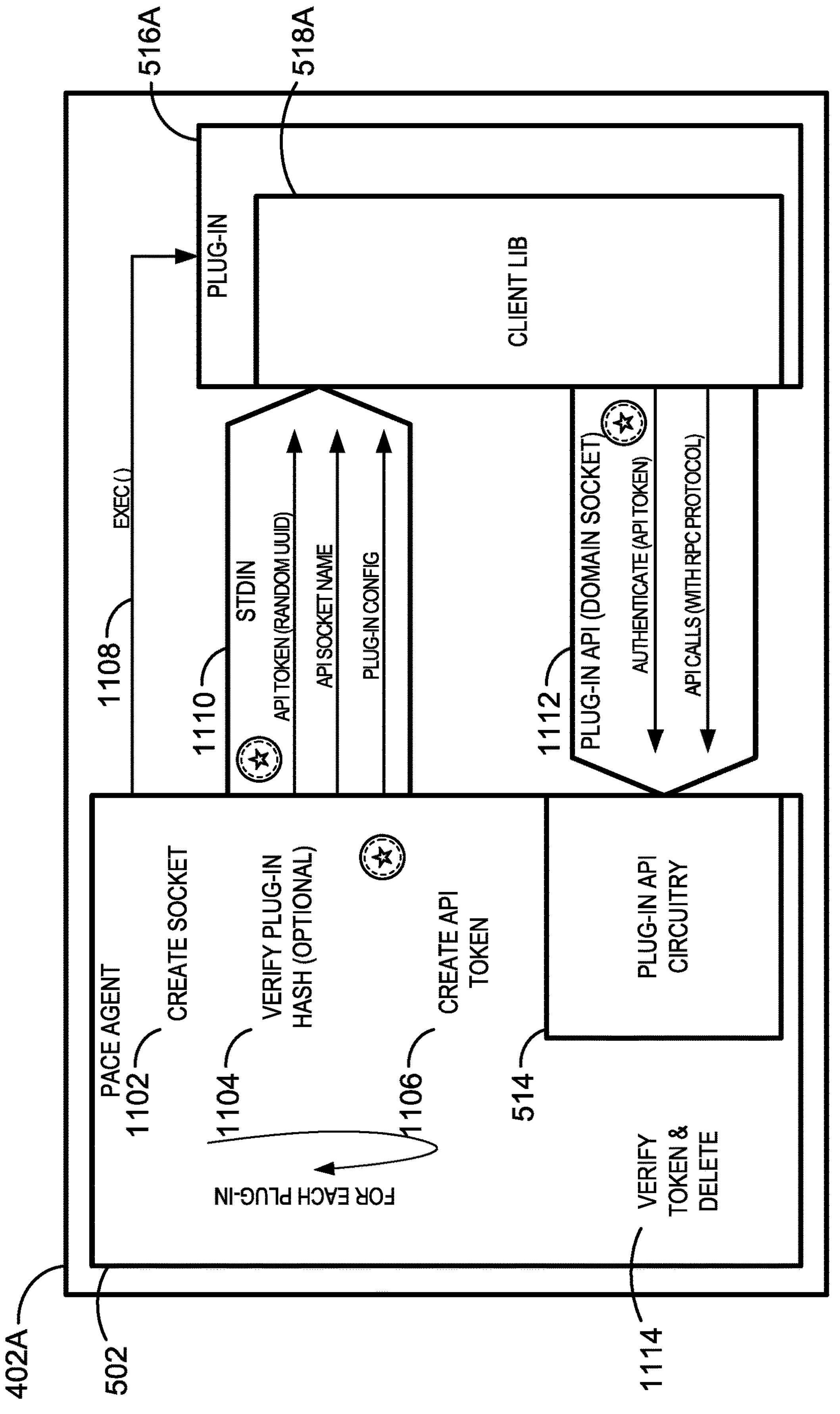
FIG. 11 is an example implementation of a PACE node of FIG. 4 starting a plug-in application.

FIG. 11 is an example implementation of a PACE node of FIG. 4 starting a plug-in application (also referred to herein as a plug-in). The example of FIG. 11 shows the PACE node 402A with only the example PACE agent 502, plug-in API circuitry 514, plug-in 516A, and client library 518A for simplicity. In practice, the PACE node 402A is implemented as described above in connection with FIG. 5 and may interact with multiple plug-ins 516. FIG. 11 also includes operations 1102, 1104, 1106, 1108, 1110, 1112, 1114.

The start-up of a plug-in begins with the operations 1102, when the agent circuitry 504 creates the API socket 536. As described above, the API socket 536 provides a software endpoint used to enable bi-directional, full-duplex communication between the plug-in API circuitry 514 and the plug-in 516A.

For each plug-in being started, the agent circuitry 504 optionally performs operations 1104 to verify a plug-in hash and performs operations 1106 to create an API token. An API token refers to a data structure that the plug-in 516A can use to authenticate itself to the agent circuitry 504 when it connects via the Plugin-In API Circuitry 514.

In the operations 1108, the agent circuitry 504 executes the plug-in executable 542, thereby instantiating the plug-in 516A.

In the operations 1110, the agent circuitry 504 provides configuration information to the plug-in 516A via process standard input (stdin). The configuration information includes the API token created in operation 1106, the name of the API socket created in operation 1102, and a configuration-file for the plug-in 516A.

In the operations 1112, the plug-in 516A uses the client library 518 to connect to the Plug-in API Circuitry via the domain API socket, authenticates by providing the API token, and begins transmitting API calls. The client library 518A provides a language-specific binding to make API calls. The API calls are transmitted to the plug-in API circuitry 514 using an RPC protocol.

In the operations 1114, the plug-in API circuitry 514 verifies the API token is matches the one created in operation 1106 and provided in operation 1110, and then deletes the token. The plug-in API circuitry 514 also provides API responses to the API call functions. By implementing operations 1102-1114, the PACE node 402A starts up the plug-in 516A and begins running application specific functions in a secure manner.

Figure 12:
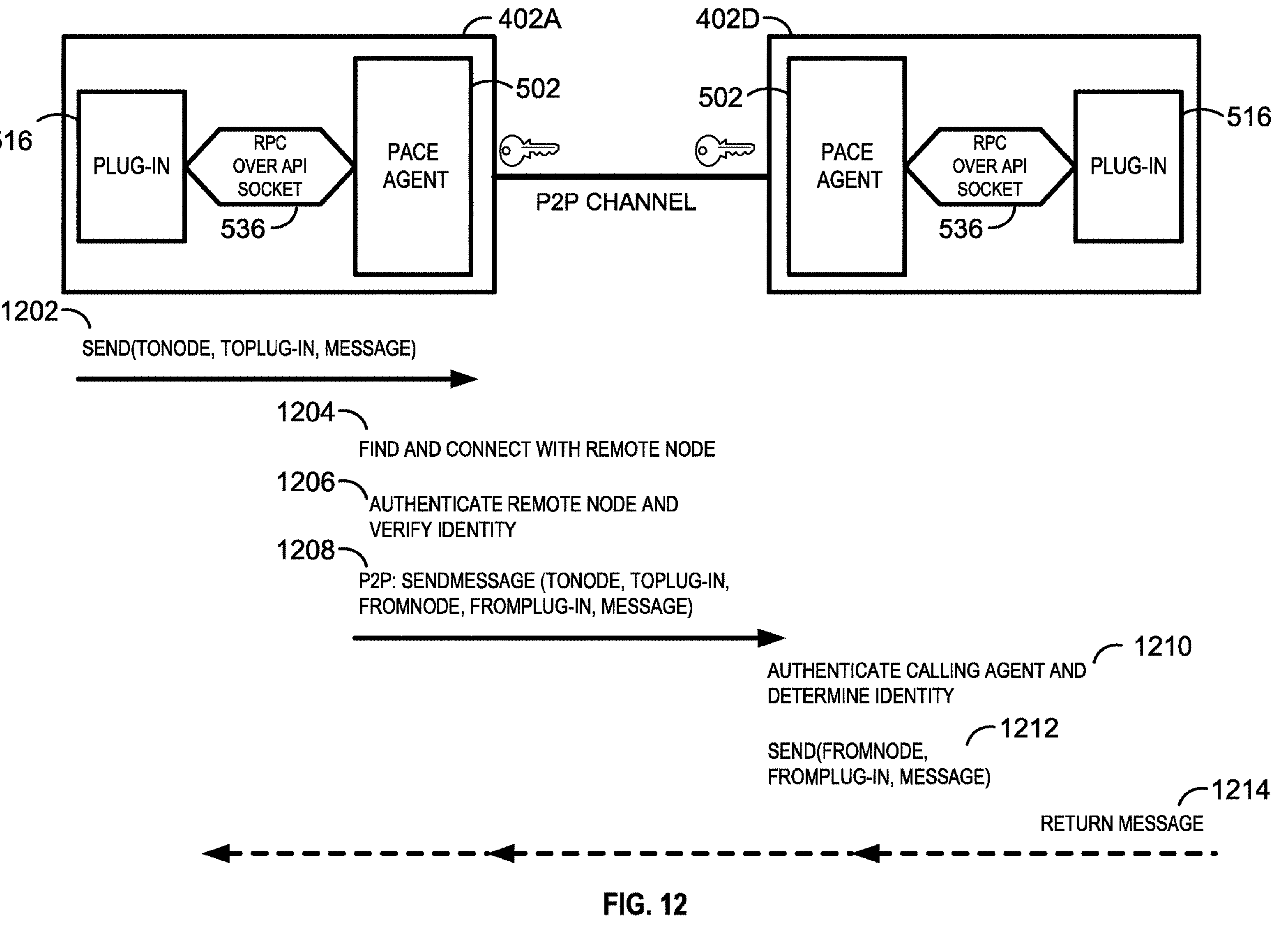
FIG. 12 is an example implementation of plug-in to plug-in communication between two of the PACE nodes of FIG. 4.

FIG. 12 is an example implementation of plug-in to plug-in communication between two of the PACE nodes of FIG. 4. The example of FIG. 12 shows the PACE nodes 402A with only the PACE agent 502 and plug-in 516A, and PACE node 402D with only PACE agent 502 and plug-in 516B, for simplicity. In practice, the PACE nodes 402A and 402D are implemented as described above in connection with FIG. 5. FIG. 12 also includes operations 1202, 1204, 1206, 1208, 1210, 1212.

Inter-device communication between plug-ins begins with operations 1202, where a plug-in (e.g., plug-in 516A of the PACE node 402A) sends a message in an API call. The API call may be transmitted using an RPC protocol to the agent circuitry 504 via the plug-in API circuitry 514 and the API socket 536. Within the API call, the plug-in 516A provides the message itself, identifies a receiving PACE node, and identifies a receiving plug-in. In the example of FIG. 12, the plug-in 516A of the PACE node 402A identifies the plug-in 516B of the PACE node 402D as the destination.

Upon receiving the API call, the agent circuitry 504 of the PACE node 402A performs operations 1204 to find and connect with the receiving PACE node (e.g., PACE node 402D). In some examples, the receiving PACE node may be referred to as a remote agent.

In the operations 1206, the agent circuitry 504 of the PACE node 402A authenticates and/or verifies the identity of the receiving PACE node. The operations 1206 may include any type of actions to authenticate and verify an identity of the remote node. For example, the agent circuitry 504 may verify the identity based on identities in the policy.

After verifying and/or identifying the receiving PACE node, the agent circuitry 504 performs operations 1208 by sending a communication to the receiving PACE node using the P2P circuitry 510 and the RPC protocol. The communication includes identifications of the transmitting plug-in and node (e.g., plug-in 516A of PACE node 402A), identifications of the receiving plug-in and node (e.g., plug-in 516B of PACE node 402D), and the message itself.

In response to obtaining the communication, the agent circuitry 504 of the receiving PACE node (e.g., PACE node 402D) authenticates and verifies the identity transmitting node (e.g., PACE node 402D) during the operations 1210. The operations 1210 may include any type of actions to authenticate and verify an identity of the transmitting node. For example, the agent circuitry 504 may verify the identity based on identities in the policy.

In the operations 1212, the agent circuitry 504 of the receiving node (e.g., PACE node 402D) sends a message to the receiving plug-in (e.g., plug-in 516B) in an API call. The API call may be transmitted using an RPC protocol to the plug-in 516B via the plug-in API circuitry 514 and the API socket 536.

The plug-in 516B performs actions based on the contents of the received message. In some examples, the actions include operations 1214, in which the plug-in 516B of PACE node 402D returns a message to plug-in 516A of PACE node 402A. The operations 1204 refers to the implementation of operations 1202-1210 in reverse order such that the return message travels from the plug-in 516B to the agent circuitry 504 of PACE node 402D, to the agent circuitry 504 of the PACE node 402A, to the plug-in 516A.

FIG. 12 illustrates how plug-ins implemented on different PACE nodes within the same cluster can communicate with one another. Inter-device communication between plug-ins enables application-specific logic of a plug-in to be based on parameters from across the entire cluster as opposed to parameters only from the node implementing the plug-in. Accordingly, each plug-in within the PACE nodes 402 can perform application specific functionality based on global cluster information. The decentralized nature of the PACE architecture enables the plug-ins to exhibit the functionality without relying on a central entity to collect or distribute the global cluster information.

Figure 13:
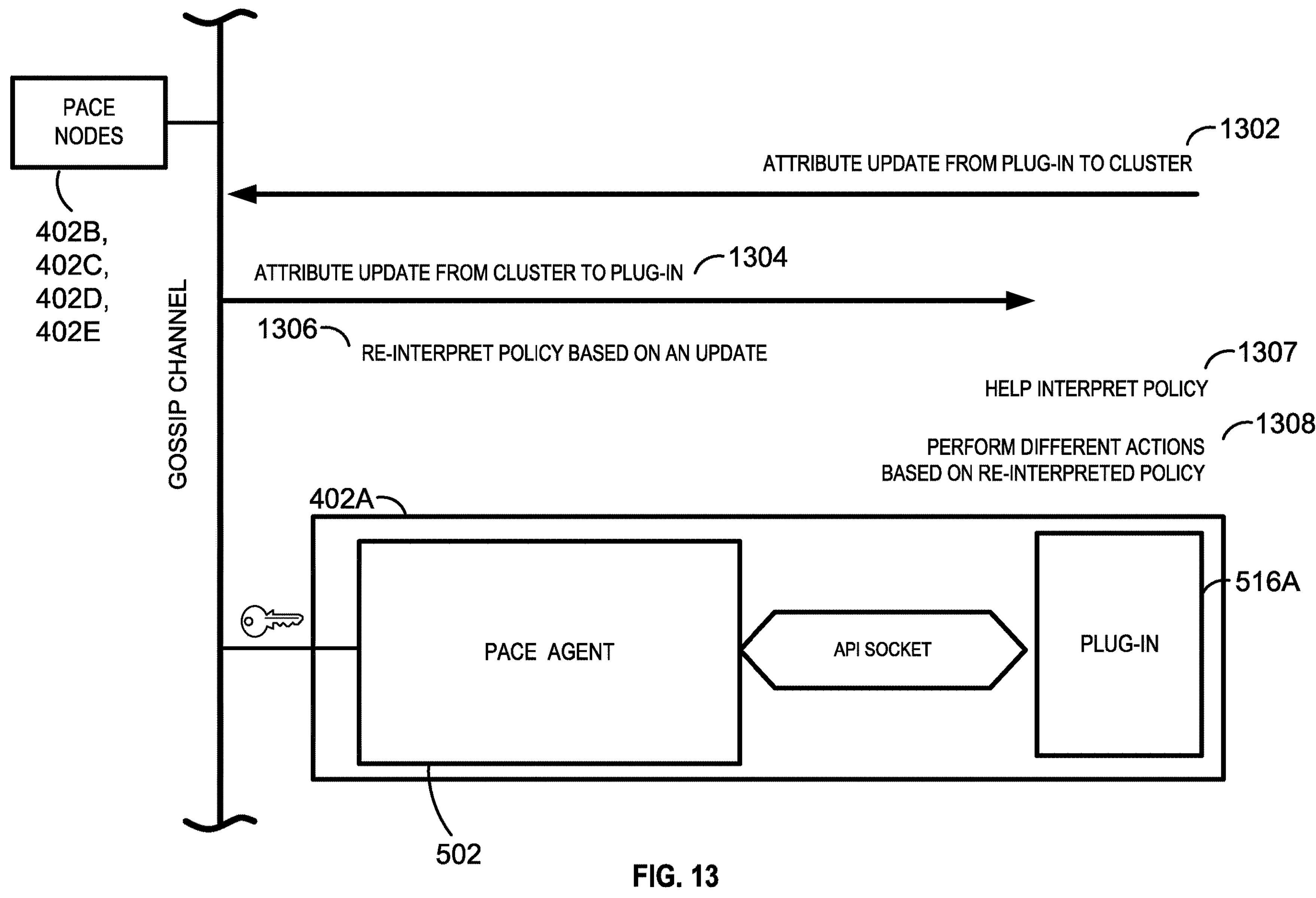
FIG. 13 is an example implementation of plug-in attribute sharing within a PACE node of FIG. 4.

FIG. 13 is an example implementation of plug-in attribute sharing within a PACE node of FIG. 4. The example of FIG. 13 shows the PACE nodes 402A with only the PACE agent 502 and plug-in 516A for simplicity. In practice, the PACE nodes 402A is implemented as described above in connection with FIG. 5. FIG. 13 also includes operations 1302, 1304, 1306, 1307, 1308.

In the operations 1302, the plug-in 516A shares an attribute update with devices in the cluster of FIG. 4. The update is shared via the API socket 536, plug-in API circuitry 514, agent circuitry 504, and gossip circuitry 512. As used above and herein, an attribute refers to a set of information that describes a characteristic of a node in the cluster. For example, an attribute state may refer to the resources available on a node or the location of the node. In some examples, the output of a plug-in describes a change in the state the describes the node. In some examples, an attribute is referred to as a state.

In the operations 1304, the plug-in 516A receives an attribute update caused by a PACE node 402B, 402C, 402D, 402E in the cluster. The update is shared via gossip circuitry 512, the agent circuitry 504, the plug-in API circuitry 514, and the API socket 536. In some examples, operations 1302 and operations 1304 occur independently of one another. Accordingly, operations 1302 may occur before or after operations 1304. In some examples, only one of operations 1302 or operations 1304 occur.

In the operations 1306, the PACE agent 502 re-interprets the current policy 526 based on an attribute update. The attribute update of operations 1306 may refer to the update of operations 1302 and/or the update of operations 1304. That is, receiving an attribute update will cause the PACE agent 502 of PACE node 402A to perform operations 1306 and re-interpret a policy, regardless of whether the attribute update describes a plug-in within the PACE node 402A or a plug-in on a different node in the cluster.

In the operations 1307, the plug-in 516A helps with the policy re-interpretation of operations 1306 by executing function calls. The function calls result in a change of roles (e.g., the addition or removal of at least one role). Accordingly, in operations 1308, the plug-in 516A performs different actions than it did previously based on the re-interpreted policy (e.g., based on the changed roles).

FIG. 13 shows how a plug-in 516A to both send and receive attribute updates via the gossip circuitry 512. The attribute updates can be used for policy execution because the functions that are called when roles are interpreted may utilize attribute updates when returning the resulting list of nodes. For example, suppose the plug-in 516A provides an attribute update that tells whether the PACE node 402A is implemented with a GPU. A plugin of PACE node 402B can utilize the attribute update when implementing a function that returns the list of nodes in the cluster that have a GPU.

Plug-ins can also use attributes shared between nodes when taking actions as a result of gaining or losing a right. For example, a right might say that PACE node 402A should execute an operating system (OS) update. However, before proceeding with the update, one of the plug-ins 516 in the PACE node 402A may check the attributes of other PACE nodes 402 to determine whether the other nodes are already performing an OS update.

While an example manner of implementing the PACE nodes 402 of FIG. 4 is illustrated in FIGS. 5-13, one or more of the elements, processes, and/or devices illustrated in FIG. FIGS. 5-13 may be combined, divided, re-arranged, omitted, eliminated, and/or implemented in any other way. Further, the agent circuitry 504, the local configuration 508, the peer-to-peer (P2P) circuitry 510, gossip circuitry 512, the plug-in Application Programming Interface (API) circuitry 514, the plug-ins 516, the client libraries 518, the memory 520, and/or, more generally, the example PACE nodes 402 of FIG. 4, may be implemented by hardware alone or by hardware in combination with software and/or firmware. Thus, for example, any of the agent circuitry 504, local configuration 508, the peer-to-peer (P2P) circuitry 510, gossip circuitry 512, the plug-in Application Programming Interface (API) circuitry 514, the plug-ins 516, the client libraries 518, the memory 520, and/or, more generally, the example PACE nodes 402, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example PACE nodes 402 of FIG. 4 may include one or more elements, processes, and/or devices in addition to, or instead of, those illustrated in FIG. 4, and/or may include more than one of any or all of the illustrated elements, processes and devices.

Flowchart(s) representative of example machine readable instructions, which may be executed by programmable circuitry to implement and/or instantiate the PACE nodes 402 of FIG. 4 and/or representative of example operations which may be performed by programmable circuitry to implement and/or instantiate the PACE nodes 402 of FIG. 4, are shown in FIGS. 7-15. The machine readable instructions may be one or more executable programs or portion(s) of one or more executable programs for execution by programmable circuitry such as the programmable circuitry 2512 shown in the example programmable circuitry platform 2500 discussed below in connection with FIG. 25 and/or may be one or more function(s) or portion(s) of functions to be performed by the example programmable circuitry (e.g., an FPGA) discussed below in connection with FIGS. 26 and/or 27. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 7-15, many other methods of implementing the example PACE nodes 402 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 7-15 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or operations, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or operations, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 14:
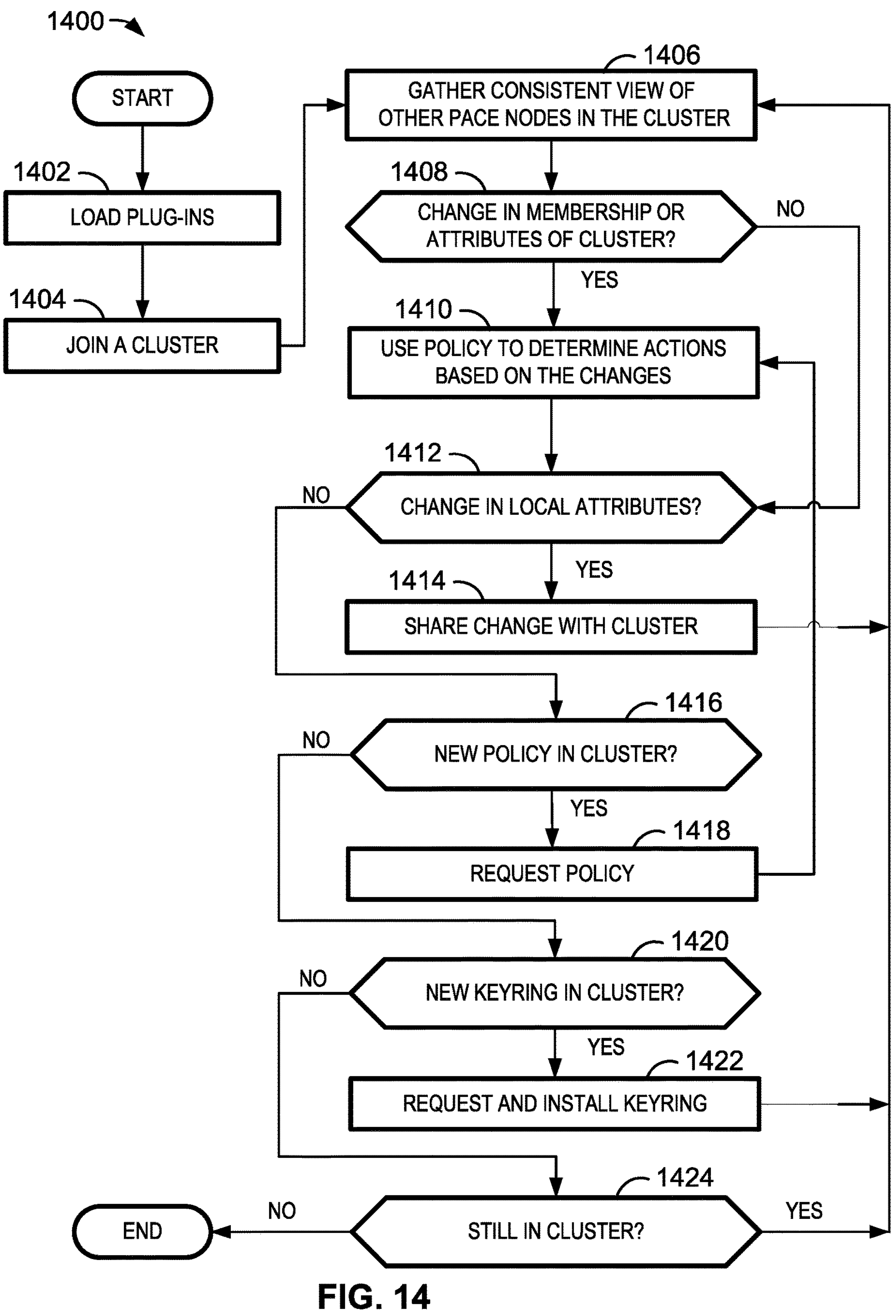
FIG. 14 is a flowchart representative of example machine readable instructions and/or example operations that may be executed, instantiated, and/or performed by example programmable circuitry to implement the PACE nodes of FIG. 4.

FIG. 14 is a flowchart representative of example machine readable instructions and/or example operations 1400 that may be executed, instantiated, and/or performed by programmable circuitry to implement the PACE node 402A. The example machine-readable instructions and/or the example operations 1400 of FIG. 14 begin when the PACE node 402A loads one or more plug-ins 516. (Block 1402). To load a plug-in, the PACE node 402A performs some or all of the operations described above in connection with FIG. 11.

The PACE node 402A joins a cluster. (Block 1404). To join a cluster, the PACE node 402A performs some or all of the operations described above in connection with FIG. 7.

After joining the cluster, the PACE node 402A gathers a consistent view of the other PACE nodes 402 in the cluster. (Block 1406). In some examples, gathering a consistent view includes verifying PACE nodes 402 that are new to the cluster. Gathering a consistent view may additionally or alternatively include the sharing of information such as new policy version, new keyring version, attribute updates, etc., using the gossip protocol. Accordingly, the implementation of block 1406 may include some or all of the operations described above in connection with FIGS. 8, 9, 10, and 13.

The PACE node 402*a* determines whether there is a change in the membership or attributes of the cluster. (Block 1408). A change in membership refers to the addition of a node to the cluster or removal of a node from the cluster. A change in attributes occurs when the PACE node 402A receives an attribute update from another device in the cluster as described above in connection with FIG. 13. In the first iteration of block 1408, the PACE node 402A considers the initial view from block 1406 to be a change (e.g. block 1408: Yes) because there was no previous view of the cluster. In subsequent iterations of block 1408, the PACE node 402 identifies changes by comparing the current view of the cluster to a preceding view of the cluster to identify information that is new or different. If a change in membership or attributes is not identified (Block 1408: No), control proceeds to block 1412.

If a change in membership or attributes is identified (Block 1408: Yes), the PACE node 402A uses the policy to determine actions based on the changes. (Block 1410). To implement block 1410, the PACE node 402A first interprets the policy by using the current cluster membership and each members state to determine which identities, roles, and rights correspond to each n ode node. The other nodes in the cluster also interpret the policy with the same information to make the same determinations regarding identities, roles, and rights in a deterministic and autonomous manner. The interpretation of the policy is discussed further above in connection with FIG. 6.

In some examples, the interpretation of the policy causes one or more of the plug-ins 516 to perform actions based on assigned rights. Actions performed by the one or more plug-ins 516 after policy interpretation include but are not limited to execution of some or all of a workload, changing a configuration, triggering communication between one or more devices, a decision to execute operations or refrain from executing operations, etc. Actions performed by the one or more plug-ins 516 are discussed further in connection with FIG. 15.

After block 1410, or if a change in membership or attributes is not identified (Block 1408: No), the PACE node 402A determines whether a change in local attribute as has occurred. (Block 1412). A local attribute refers to a characteristic of the PACE node 402A (as opposed to the attributes of block 1408, which described characteristics of other nodes in the cluster). If a local attribute has changed, (Block 1412: Yes), the PACE node 402A shares the change with the cluster. (Block 1414). The PACE node 402A uses the gossip circuitry 512 to share attribute changes with the cluster as discussed further above in connection with FIG. 13. Control returns to block 1406 after block 1414.

If none of the local attributes have changed (Block 1412: No), the PACE node 402A determines whether there is a new policy in the cluster. (Block 1416). The PACE node 402A uses the gossip circuitry 512 to determine whether another node is advertising a new policy. A node may advertise a new policy for any reason.

If an new policy is present (Block 1416: Yes), the PACE node 402A requests the new policy. (Block 1418). The PACE node 402A uses the P2P circuitry 510 to request the new policy as discussed above in connection with FIG. 9.

Control returns to block 1410 after block 1418, where the PACE node 402A determine actions based on the change in policy.

If a new policy was not present (Block 1416: No), the PACE node 402A determines whether a new keyring is in the cluster. (Block 1420). The PACE node 402A uses the gossip circuitry 512 to determine whether another node is advertising a new keyring. Another node may advertise a keyring for any reason, including but not limited to the passage of time.

If a new keyring is present (Block 1420: Yes), the PACE node 402A requests and installs the keyring. (Block 1422). The implementation of block 1422 may include some or all of the operations described above in connection with FIG. 10. Control returns to block 1406 after block 1422.

If a new keyring is not present (Block 1420: No), the PACE node 402A determines if it is still in the cluster that was joined in block 1404. (Block 1424). A node may leave a cluster for any reason, including but not limited to becoming compromised, completing a task, receiving instructions to leave from an external source, etc.

If the PACE node 402A is still in the cluster (Block 1424: Yes), control returns to block 1406 where each of the PACE nodes 402 gather an updated and consistent view of the other nodes in the cluster. If the PACE node 402A is no longer in the cluster (Block 1424: No), the machine-readable instructions and/or operations 1400 end.

Figure 15:
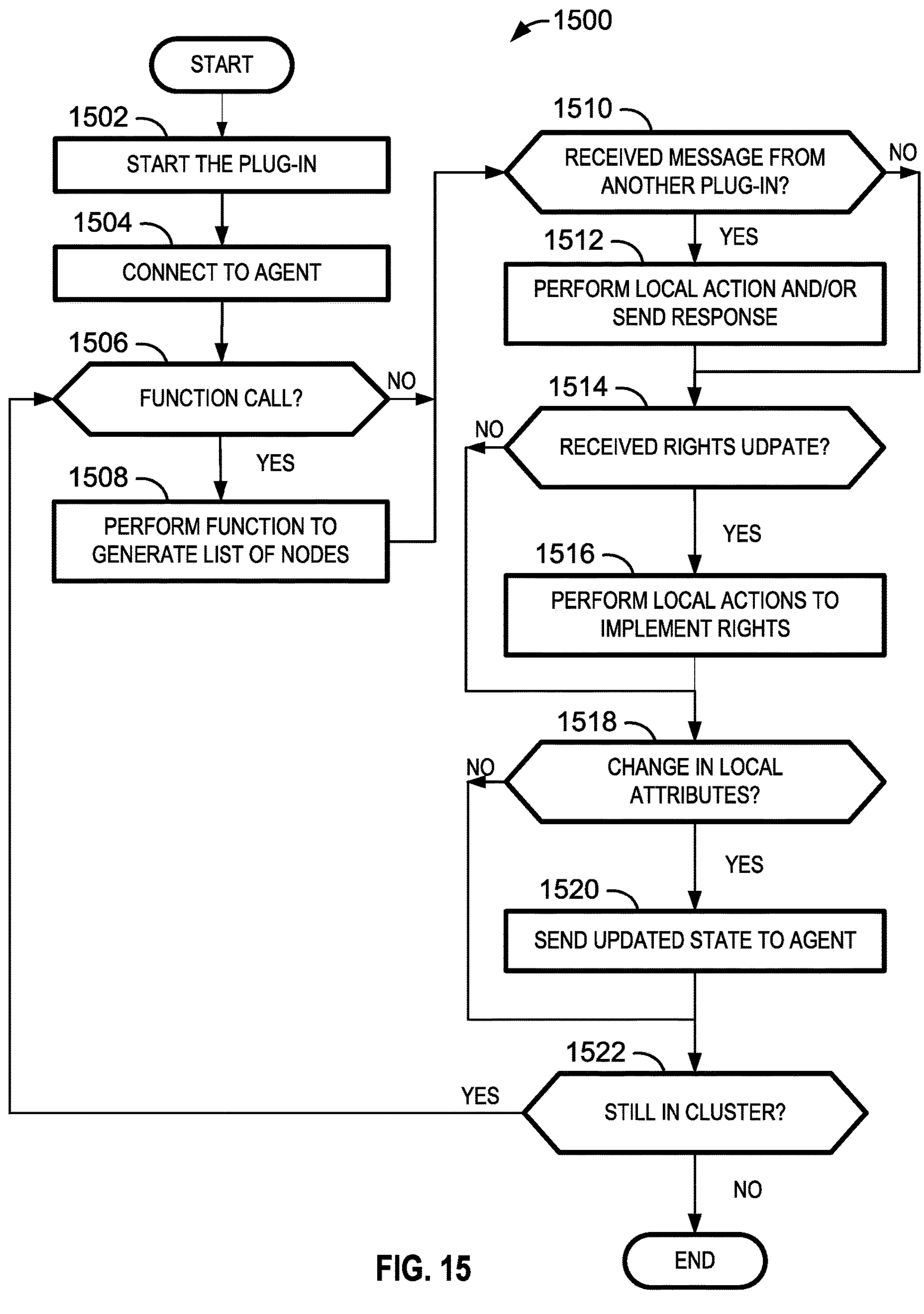
FIG. 15 is flowchart representative of example machine readable instructions and/or example operations that may be executed, instantiated, and/or performed by example programmable circuitry to implement a plug-in of FIG. 5.

FIG. 15 is flowchart representative of example machine readable instructions and/or example operations 1500 that may be executed, instantiated, and/or performed by example programmable circuitry to implement a plug-in 516A. In some examples, the machine readable instructions and/or operations 1500 of FIG. 15 may be implemented concurrently with the machine readable instructions and/or operations 1400 of FIG. 14.

The machine readable instructions and/or operations 1500 begin when the PACE node 402A starts the plug-in 516A. (Block 1502). To start the plug-in, the PACE node 402A may the agent circuitry 504 executes the plug-in executable 542, thereby instantiating the plug-in 516A. In some examples, the PACE node 402A starts some or all of the plug-ins 516.

The plug-in 516A connects to the PACE agent 502. (Block 1504). To connect to the PACE agent 502, the plug-in 516A may perform some or all of the operations described above in connection with FIG. 11.

The PACE agent 502 determines whether to perform a function call. (Block 1506). A function call refers to operations performed during policy interpretation that result in a role. The PACE agent 502 may perform a function call in response to a determination to interpret a policy. In some examples, a function call is part of the implementation of block 1410 of FIG. 14. If a function call has not occurred (Block 1506: No), control proceeds to block 1510.

If a function call has occurred (Block 1506: Yes), the plug-in 516A performs the function. (Block 1508). For example, the PACE agent 502 may implement block 1508 using one or more of the ALL, SUBTRACT, PICKN, etc., function calls described above in connection with FIG. 6. The result of the one or more function calls is a role (e.g., a list of nodes).

After block 1508, or if the PACE agent 502 determined not to implement a function call (Block 1506: No), the plug-in 516A determines if a message from another plug-in 516 has been received. (Block 1510). The plug-in transmitting the message may be implemented locally (e.g., within the PACE node 402A) or implemented remotely (e.g., by another node within the cluster). If the plug-in 516A has not received a message (Block 1510: No), control proceeds to block 1514.

If the plug-in 516A has received a message (Block 1510: Yes), the plug-in 516A performs a local action. (Block 1512). A local action refers to an action (e.g., execution of some or all of a workload, a decision to execute operations or refrain from executing operations, etc.,) that occurs within the device implementing the plug-in 516A that received the message. The plug-in 516A may additionally or alternatively send a response to the message in block 1512.

After block 1512, or if a message was not received (Block 1510: No), the plug-in 516A determines whether an update to rights has been received. (Block 1514). An update to rights occurs as a result of re-the PACE agent 502 re-interpreting an existing policy or interpreting a new policy. If an update to rights has not been received (Block 1514: No), control returns to block 1518. If an update to rights has occurred (Block 1514: Yes), the plug-in 516A performs one or more local actions to implement the rights. (Block 1516).

After Block 1516, or if an update to rights was not received (Block 1514: No), the plug-in 516A determines whether there was a change in local attributes. (Block 1518). If a local attribute has not changed, (Block 1518: No), control proceeds to block 1522.

If a local attribute has changed, (Block 1518: Yes), the plug-in 516A shares the change with the PACE agent 502. (Block 1520). The PACE agent 502 then shares the change with the rest of the cluster as described in block 1414 of FIG. 14.

After block 1520, or if there was no changes in local attributes (Block 1518: No), the PACE node 402A determines if it is still in the current cluster. (Block 1522). A node may leave a cluster for any reason, including but not limited to becoming compromised, completing a task, receiving instructions to leave from an external source, etc.

If the PACE node 402A is still in the cluster (Block 1522: Yes), control returns to block 1506 where the PACE agent 502 determines whether to perform a function call. If the PACE node 402A is no longer in the cluster (Block 1522: No), the machine-readable instructions and/or operations 1500 end.

Figure 16:
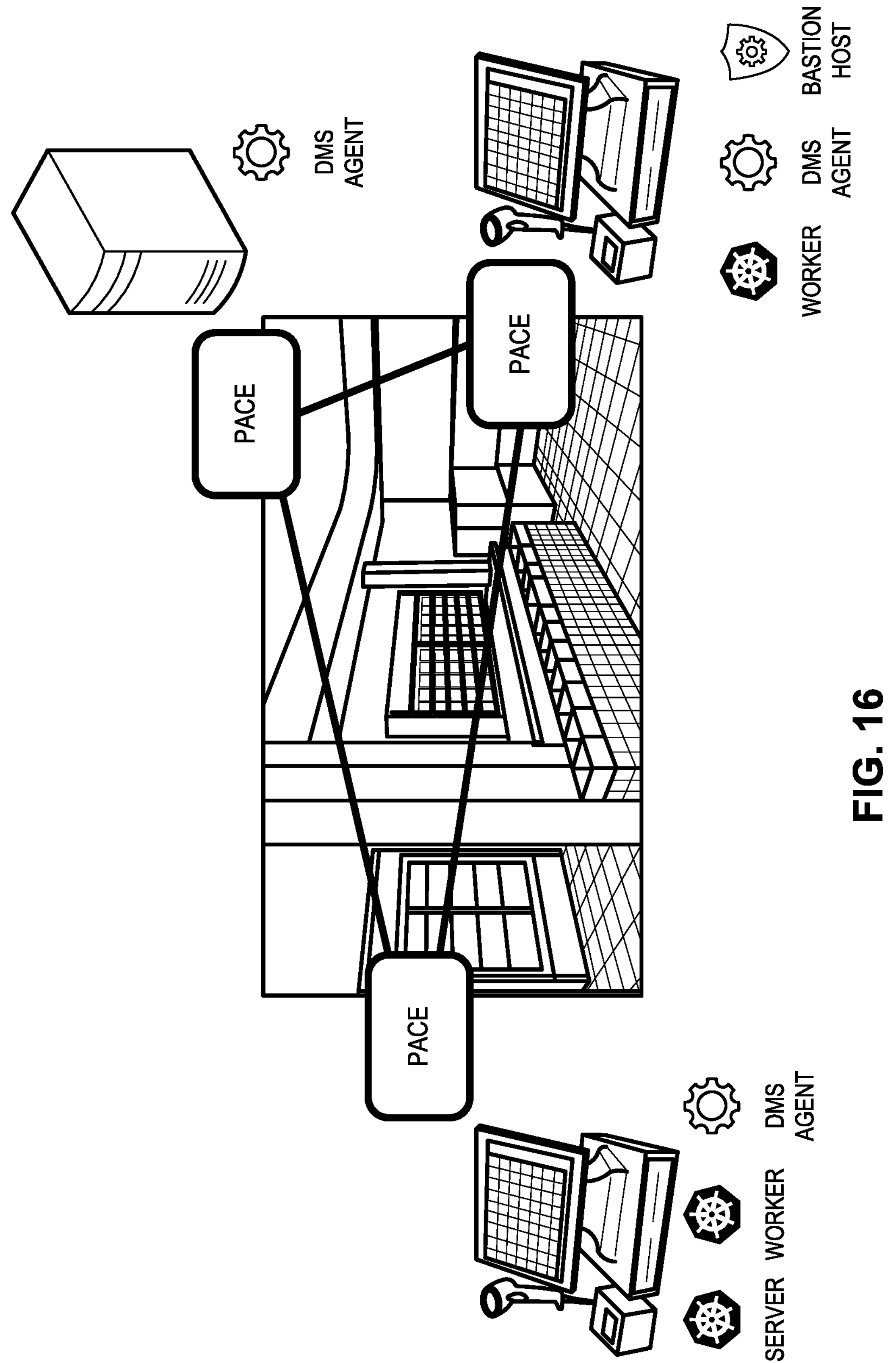
FIG. 16 illustrates an example use case of PACE nodes to manage system services.

FIG. 16 is a use case of PACE nodes to manage system services. FIG. 16 describes a hypothetical scenario with a business that use nodes (e.g., compute devices) to support a variety of roles. The roles include a server role, a worker role, a Data Migration Service (DMS) agent, and a bastion host. Suppose at first, the business is small, and there is only one node. In such examples, the one node will run each of the foregoing roles. When a second node is added, only one node needs to be the server role and only one node needs to be the bastion host. As the business grows, a subset of nodes may be designated as the enterprise servers and might form a multi-node server role. In clusters managed by central entities, moving between the foregoing configurations may require a system manager to decide what functions will run where, install software, and distribute appropriate credentials.

To implement PACE in FIG. 16 according with teachings of this disclosure, a system manager only needs to deploy a PACE agent 502 on each node, along with a policy that describes how the system should behave. The policy might state that each node needs to run the DMS agent, and would determine, based on cluster size and characteristics, where the bastion host should be located, how many nodes to use in the server role, and which nodes they should be. These functions can automatically be deployed and credentialed, as resources are added or removed from the cluster.

If the system manager wishes to change the policy that describes which services to be deployed and where, the manager need only inject a new policy into one of the nodes. Using some or all of the operations described above in connection with FIG. 9, the node with the new policy will share this policy with all nodes in the cluster and implement the new instructions.

Figure 17:
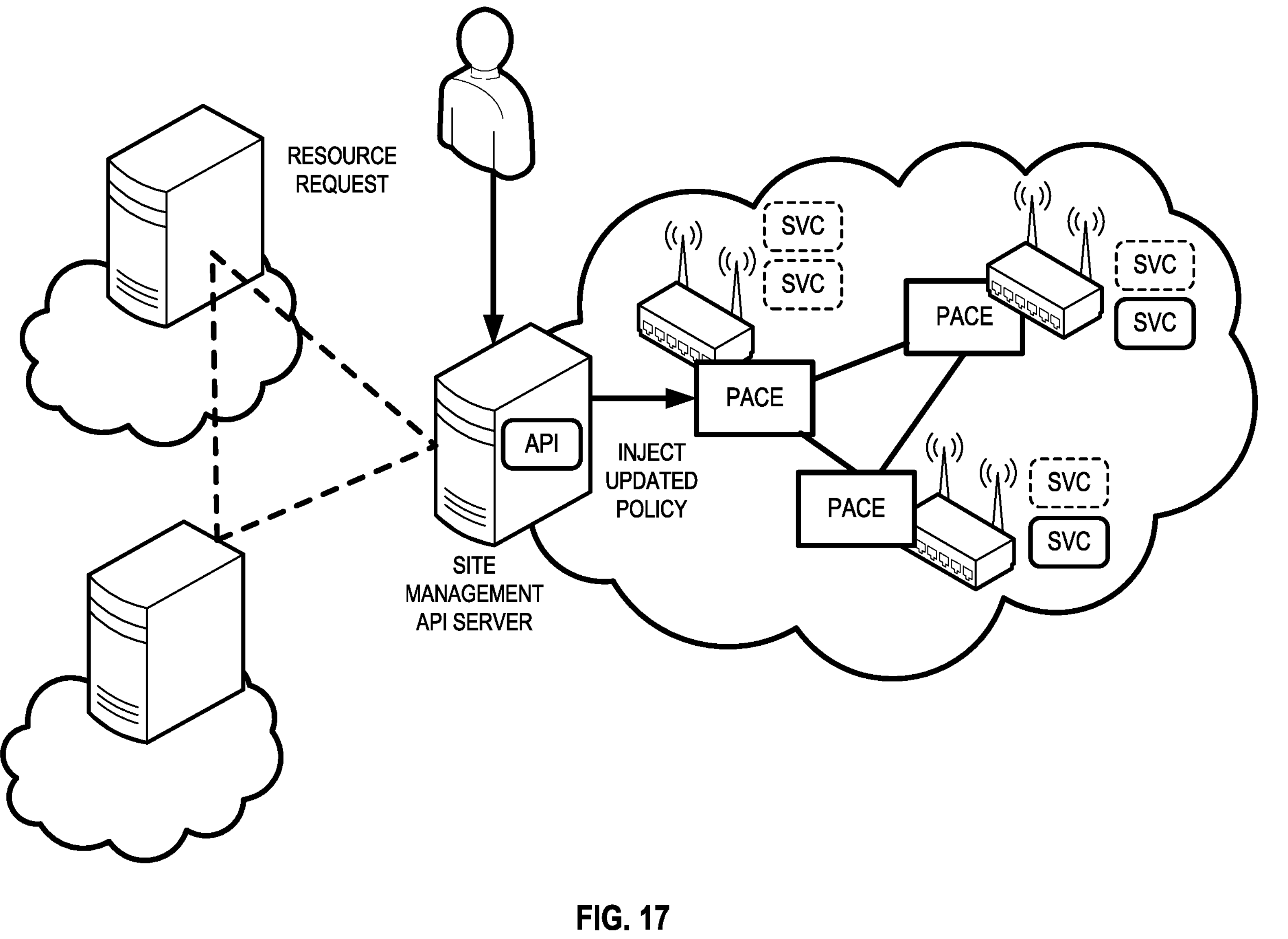
FIG. 17 illustrates an example use case of a policy in a PACE cluster to implement an API.

FIG. 17 is a use case of a policy in a PACE cluster to implement an API. FIG. 17 describes an extension of the use case described in FIG. 16. Suppose the system manager of the hypothetical business wants to define an API that allows the system services deployed on a cluster to be deployed from a cloud service. An API service with minimal logic can be developed that serves the API and translated the API calls into policy. On each new API call, the policy is adjusted and injected into the cluster, changing the set of services deployed in response to the API calls. In some examples, the API service with minimal logic is referred to as a thin API.

The API service can be composed of minimal logic because the implementation of the policy is at each node and no additional agents on the nodes are required. The API service can also be stateless because the state is in the policy, which is distributed throughout the cluster. As a result, the API service can also be deployed by PACE to any node in the cluster, as defined in the policy.

Figure 18:
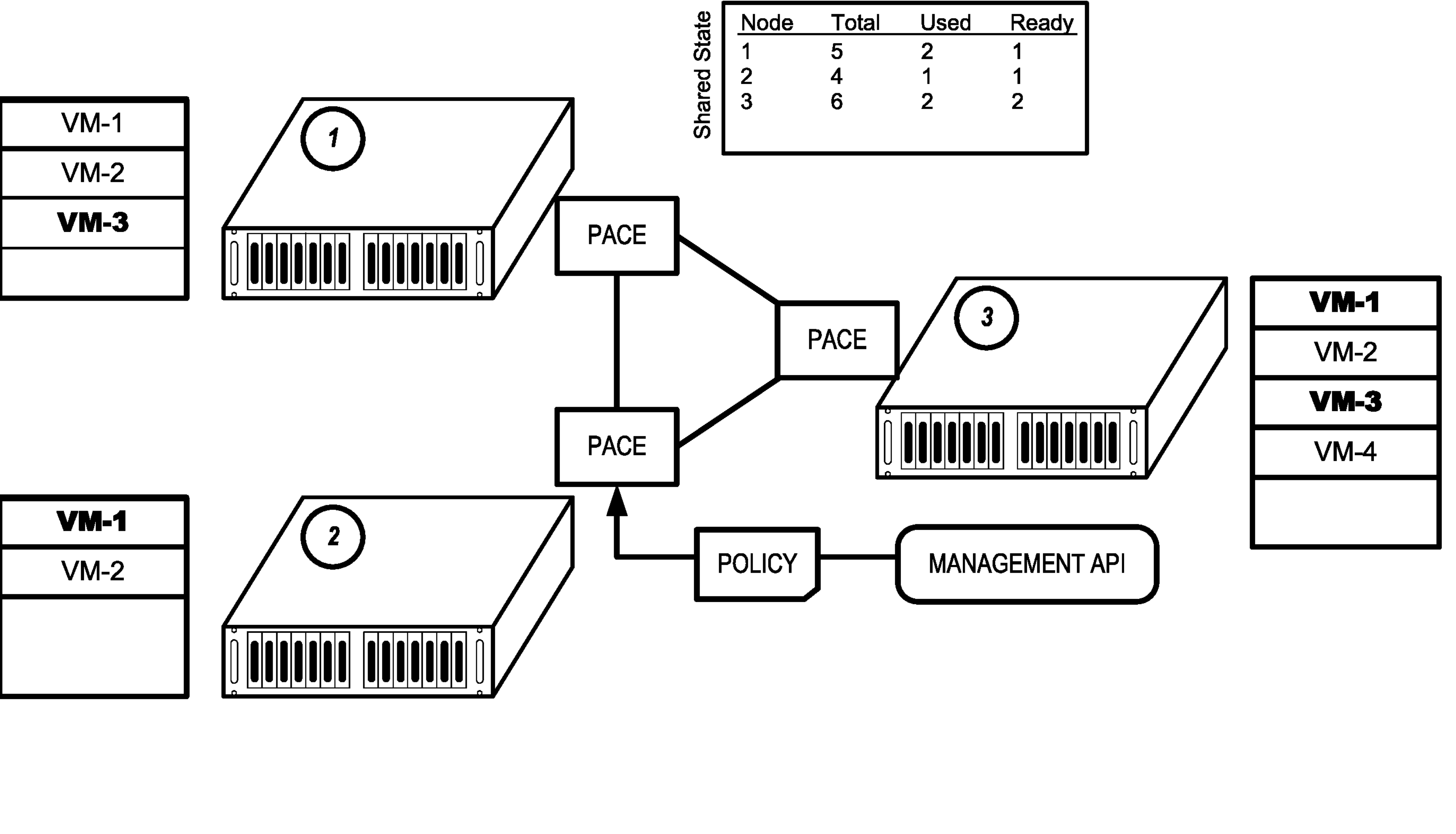
FIG. 18 illustrates an example use case of PACE nodes to configure resources to maintain available capacity.

FIG. 18 is a use case of PACE nodes to configure resources to maintain available capacity. While the foregoing use cases described in FIGS. 16-17 concern the management of services, PACE can also manage device resources such as virtual machines (VMs). Suppose a system manager wishes to create an API that allows callers to begin or end VMs that are deployed in a cluster. Each node might have a certain amount of capacity for deploying VMs. When a user places an API request to deploy a VM, the API finds a node that has spare capacity and deploys the VM. Information about the new VM is reported by the API. The API can also report on available resources and running VMs.

Suppose further that the API is a thin service that creates a PACE policy. When a user requests a new VM, an entry is added to the policy and the PACE cluster determines where to deploy the VM. Each node in the PACE cluster has attributes that represent the available capacity, allowing the nodes to collaboratively determine where to deploy the new VM. PACE provides secure inter-process communication that can allow the API service to determine the status of the VM as it boots Like the use cases described above, the API service can be thin, stateless, and deployed by a PACE node according to the policy.

Figure 19:
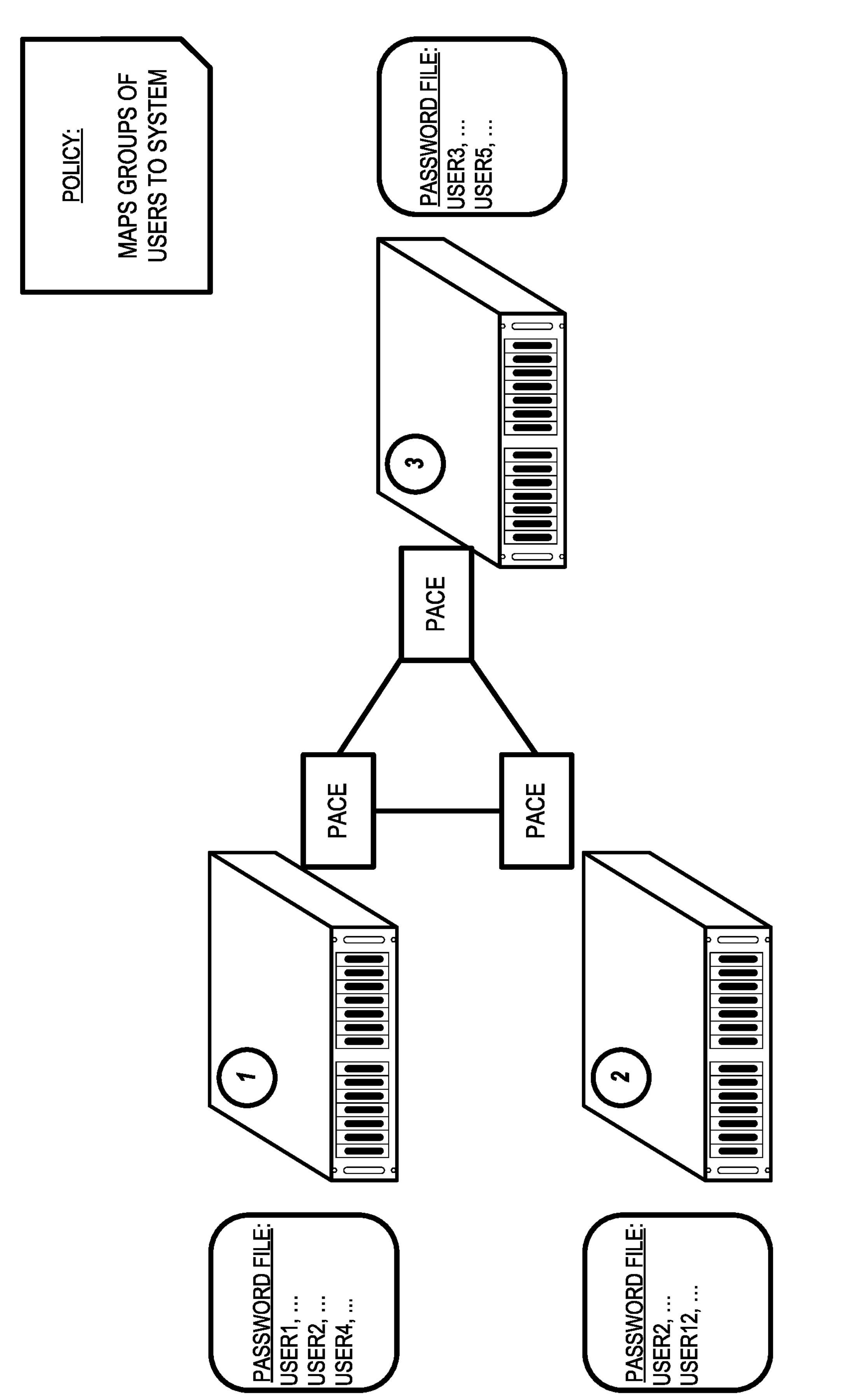
FIG. 19 illustrates an example use case of PACE nodes to determine a system configuration.

FIG. 19 is a use case of PACE nodes to determine a system configuration. In FIG. 19, access to a cluster of devices is controlled using a PACE policy. The policy might define which users should have access to different devices, based on device characteristics. Each right in the policy would map to a user, and policy poles would select devices that each user should have access to. A PACE plug-in would then take each resulting right for each system and inject an entry into the password file of that system. Inter-plugin communication could ensure consistent access credentials across all systems.

PACE may additionally be used for a wide variety of system configuration tasks, including but not limited to access controls, service configuration, firewall rules, etc. Any form of configuration could be managed through policy rules.

Figure 20:
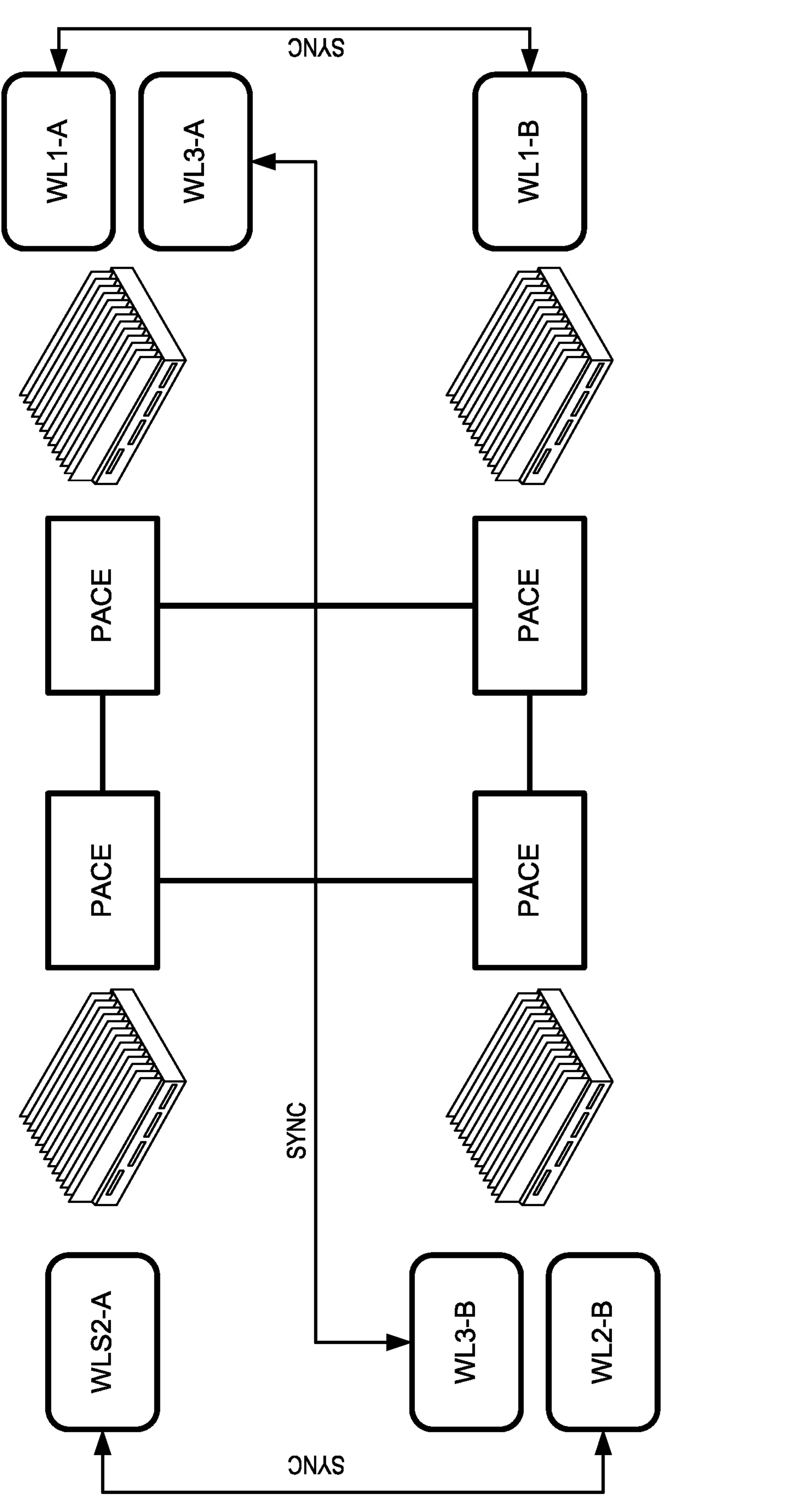
FIG. 20 illustrates an example use case of PACE nodes to manage mission-critical workloads in a high-availability configuration.

FIG. 20 is a use case of PACE nodes to manage mission-critical workloads in a high-availability configuration. Industrial workloads may be stateful and require failure recovery within a single cycle (e.g., a small number of milliseconds or less). As a result, availability may be achieved by running workloads in active/standby pairs. Both the active and standby workload receive the same input. The two workloads operate on incoming data and synchronize/compare state, and then the active workload sends output downstream. When a failure of the active workload occurs, the standby workload quickly detects the failure and takes over the active role. In such a use case, manageability provides deployment of active/standby pairs with anti-affinity (e.g., not deployed on the same compute) and replacement of failed workloads to re-establish redundancy.

One way to achieve manageability in this high availability scenario is to use a central entity to deploy the workloads, monitor their liveliness, and redeploy as needed. However, in a small cluster, as might occur at a remote wellhead, the overhead of the central entity to manage a small number of workloads on a few nodes will be very high. The overhead may increase further if the central entity runs with redundancy to assure availability. As a result, some organizations may reasonably use three central entity servers to support a small, two to four node cluster.

Alternatively, PACE can be used in accordance with the teachings of the disclosure to allow the small cluster to manage itself. In the example of FIG. 20, four nodes are used to run three workloads (WL), each in a redundant configuration.

PACE can run on all nodes, providing a highly available control plane with minimal additional cost and no additional nodes required for manageability. The control plane can operate even if the cluster decreases in number to a single node. In contrast, if a central entity were deployed in a redundant configuration on all worker nodes, it does not have the same resilience properties and would typically fail when the number of nodes in the management set decreases to n/2.

The PACE policy will specify that each workload and its pair should run on different nodes. PACE can monitor the cluster for failures and redeploy workloads when cluster membership changes.

Figure 21:
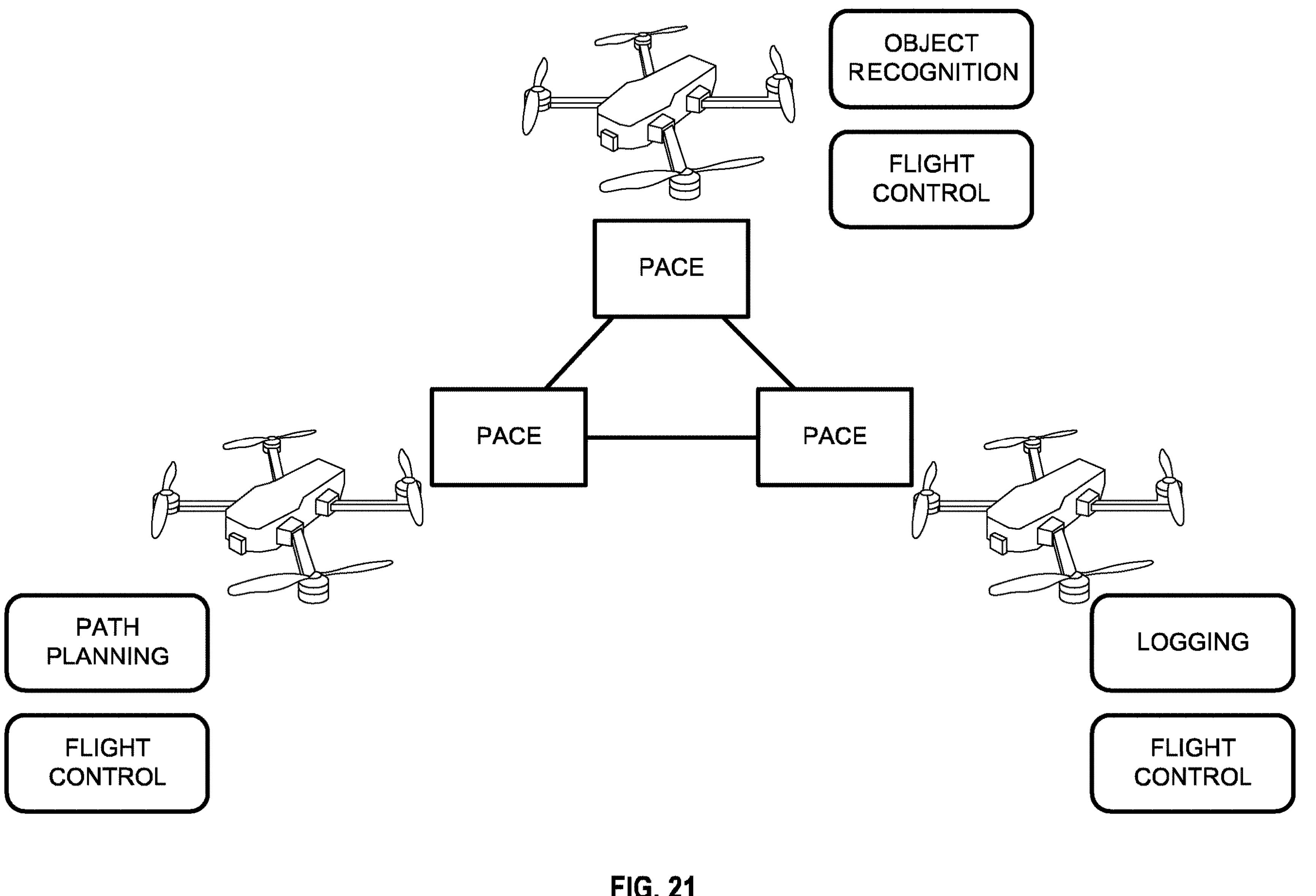
FIG. 21 illustrates an example use case of PACE nodes to manage mission-critical workloads in a dynamic cluster of mobile nodes.

FIG. 21 is a use case of PACE nodes to manage mission-critical workloads in a dynamic cluster of mobile nodes. FIG. 21 describes a hypothetical first-responder use case where unmanned aerial vehicles (UAVs) are used to search for disaster survivors. A cluster of such UAVs may work together on a given mission, where different parts of the task may be supported by each UAV. While all devices might have Flight Control functions, only one device needs to provide object recognition, while another provides path planning. However, if the set of devices changes, perhaps due to failure or separation, these functions may need to be taken over by other devices.

In the example of FIG. 21, PACE is ideal for managing the functions of the cluster. A policy can define the set of functions and the requirements for their deployment in the cluster, as well as what to do if resources become too limited to perform all functions or if the cluster becomes partitioned. Furthermore, because PACE utilizes self-organization and distributed consensus, PACE can provide cluster management in the face of partitioning or loss of all but a single node.

Figure 22:
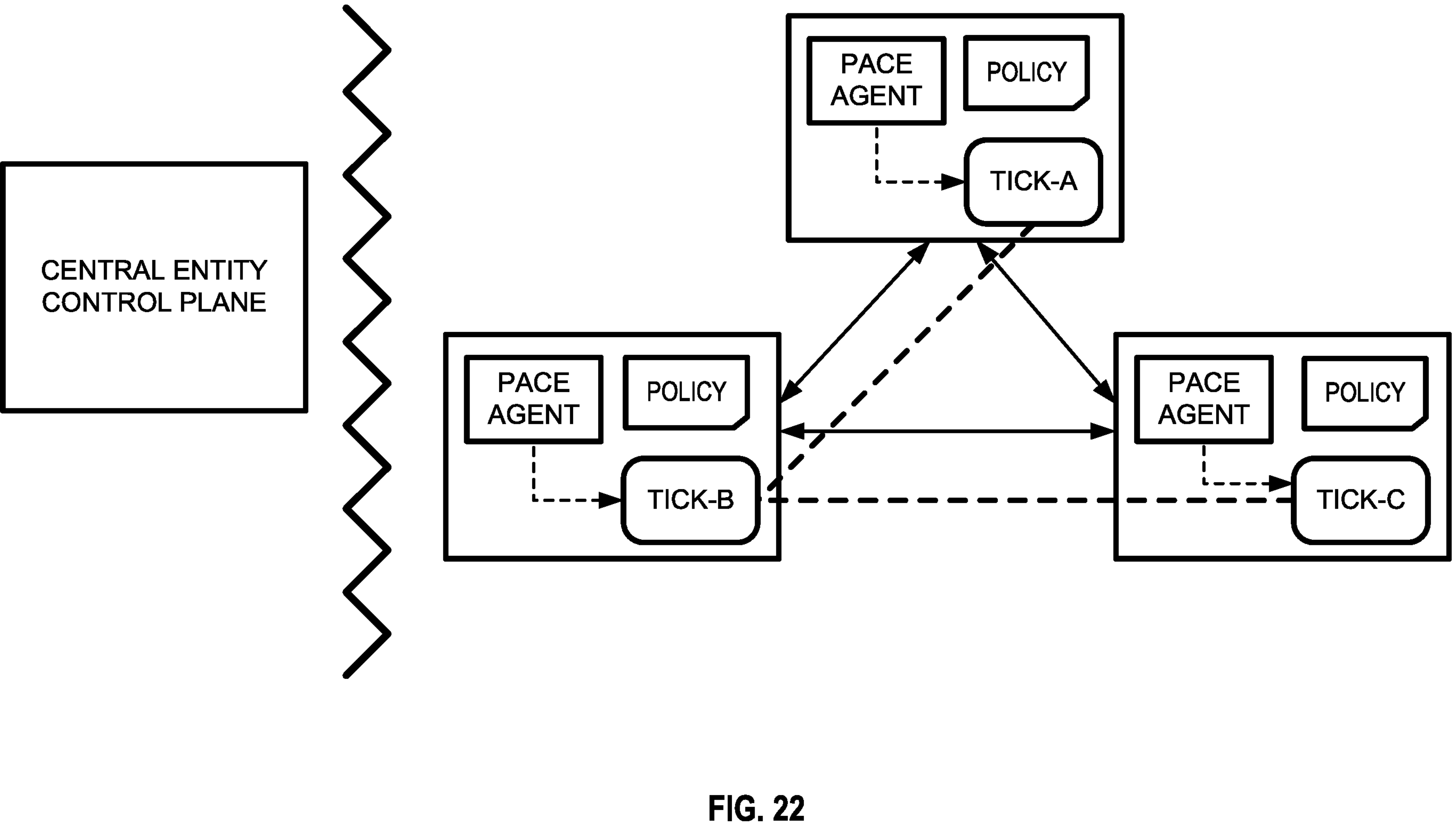
FIG. 22 illustrates an example use case of PACE nodes to manage a periodically connected cluster.

FIG. 22 is a use case of PACE nodes to manage a periodically connected cluster. In the example of FIG. 21, a mobile cluster can utilize PACE to provide management of tasks across the cluster. However, when such a cluster is attached to infrastructure (e.g., before deployment of the UAVs), the cluster could be managed by that infrastructure. A PACE policy can be defined that allows for switching between these two scenarios.

When connected to an infrastructure that has a central entity control plane, for example, PACE can deploy a control agent on each node, configured to attach to the infrastructure. In this scenario, workloads deployed via the central entity can be run on the cluster. When disconnected from the infrastructure, however, PACE will deactivate the control agent, and instead directly run the mission workloads.

Figure 23:
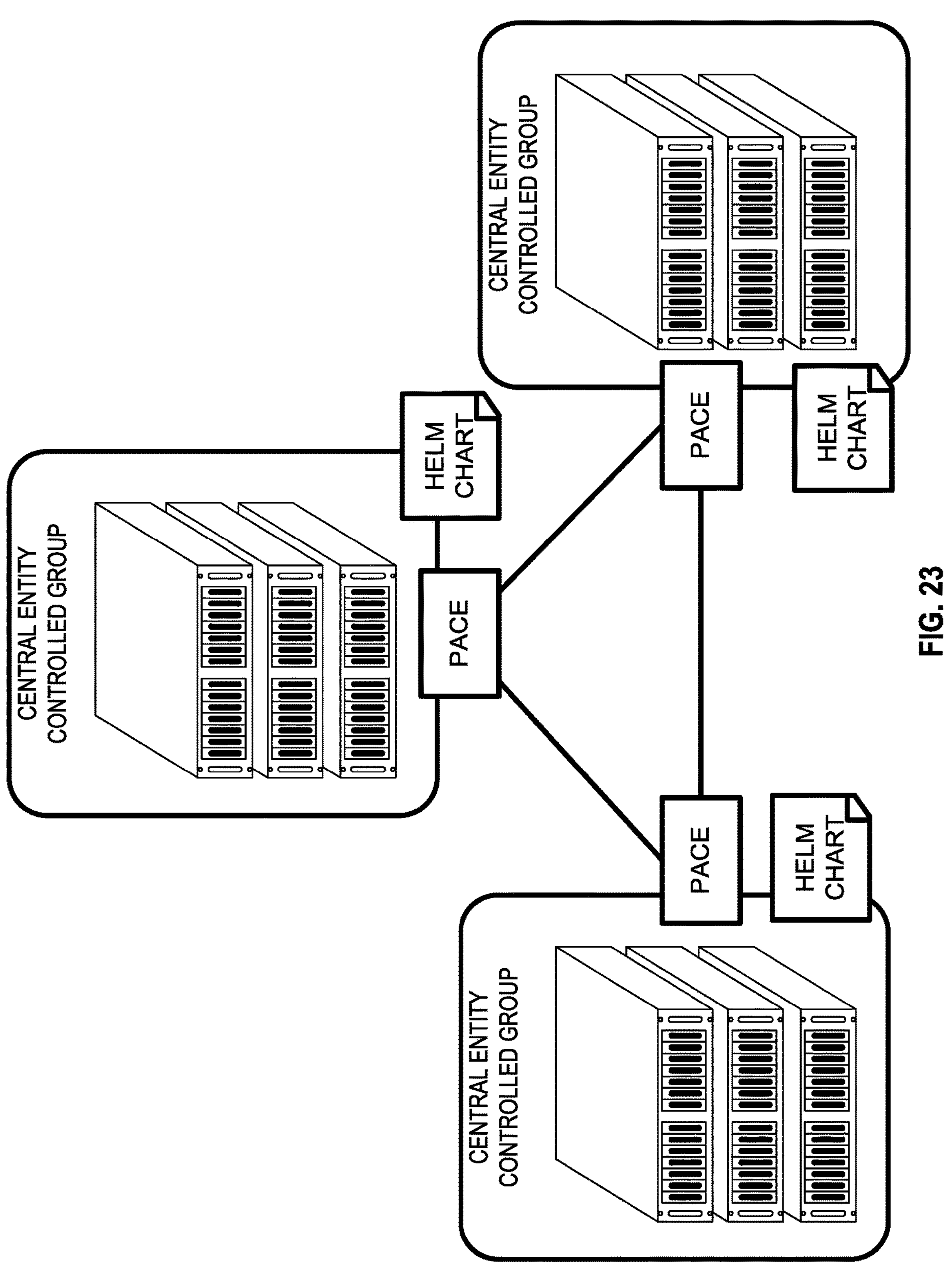
FIG. 23 illustrates an example use case of PACE nodes to task sub-clusters based on whether a sub-cluster is connected or disconnected.

FIG. 23 is a use case of PACE nodes to task sub-clusters based on whether a sub-cluster is connected or disconnected. FIG. 23 describes a hypothetical military scenario where several ships form a PACE cluster. Each ship has its own data center, each managed by a central entity. PACE can be used to task each central entity, depending on situational factors. Such situational factors may include but are not limited to which ships are present, the attributes and status of the ships, the location of the ships, environmental conditions, etc. In the example of FIG. 21, the policy specifies what tasks to inject into each central entity under various circumstances. A plug-in then injects a description of the desired tasks into each central entity.

Figure 24:
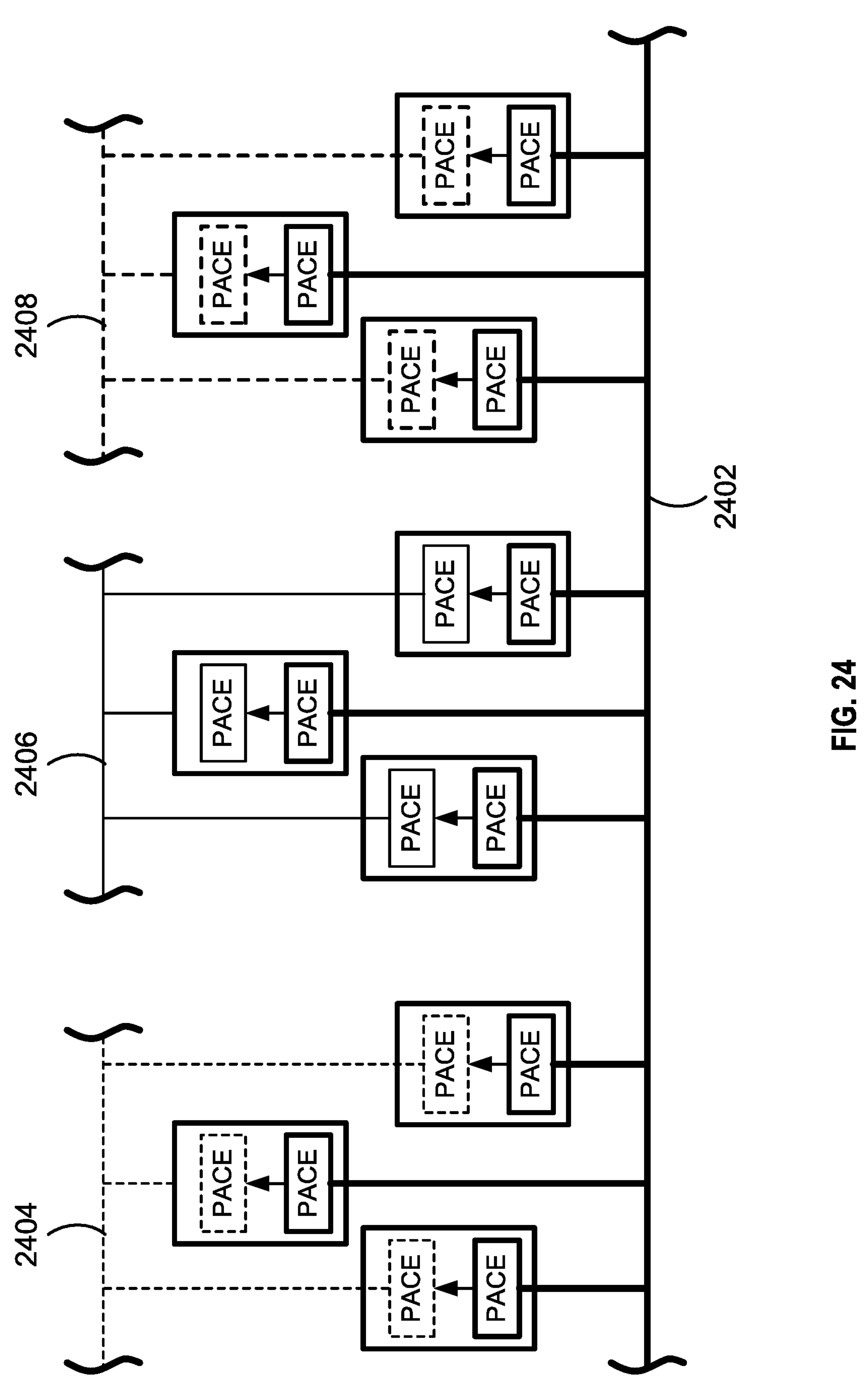
FIG. 24 illustrates an example use case of meta-level PACE nodes to manage sub-clusters of PACE nodes.

FIG. 24 is a use case of meta-level PACE nodes to manage sub-clusters of PACE nodes. In the foregoing use case examples of FIGS. 16-23, PACE formed a cluster based on discoverable nodes. In some examples, PACE discovers all nodes on the current local area network (LAN). In other examples, a user specifies addresses of PACE nodes to be discovered in the PACE configuration file. Such other examples allow for clusters to form across LANs. Only nodes with the same cluster ID (also specified in the PACE configuration file) will form a cluster. Additionally, sub-clusters may be formed by using PACE to configure and launch PACE.

In the example of FIG. 24, all nodes run an instance of PACE with a policy that determines which nodes should be in which sub-cluster. In FIG. 24, cluster 2402 is a meta-cluster and clusters 2404, 2406, 2408 are sub-clusters. In such an example, a plug-in within the cluster 2402 configures and launches other instances of PACE within clusters 2404, 2406, 2408. A given sub-instance of PACE is configured with a specific cluster ID for the sub-cluster. After implementation, any one of the clusters 2404, 2406, 2408 is then able to implement any of the use cases described above.

Figure 25:
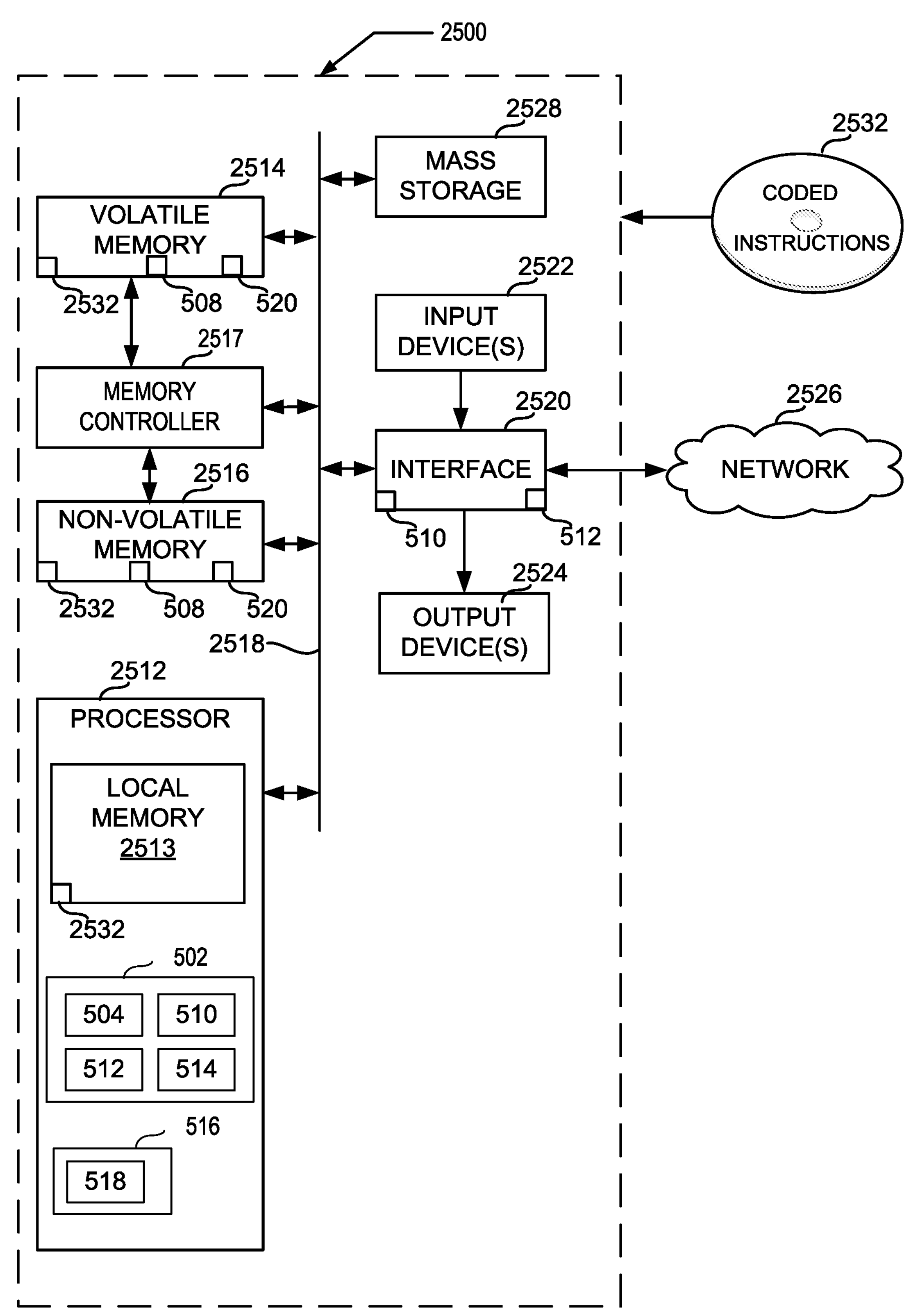
FIG. 25 is a block diagram of an example processing platform including programmable circuitry structured to execute, instantiate, and/or perform the example machine readable instructions and/or perform the example operations of FIGS. 7-15 to implement the PACE nodes 402 of FIG. 4.

FIG. 25 is a block diagram of an example programmable circuitry platform 2500 structured to execute and/or instantiate the example machine-readable instructions and/or the example operations of FIGS. 7-15 to implement the PACE nodes 402 of FIG. 4. The programmable circuitry platform 2500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 2500 of the illustrated example includes programmable circuitry 2512. The programmable circuitry 2512 of the illustrated example is hardware. For example, the programmable circuitry 2512 can be implemented by one or more integrated circuits, logic circuits, FPGAs, microprocessors, CPUs, GPUs, DSPs, and/or microcontrollers from any desired family or manufacturer. The programmable circuitry 2512 may be implemented by one or more semiconductor based (e.g., silicon based) devices. In this example, the programmable circuitry 2512 implements the PACE agent 502 (which includes the agent circuitry 504, the P2P circuitry 510, the gossip circuitry 512 and the plug-in API circuitry 514) and the plug-in 516 (which includes the client library 518).

The programmable circuitry 2512 of the illustrated example includes a local memory 2513 (e.g., a cache, registers, etc.). The programmable circuitry 2512 of the illustrated example is in communication with main memory 2514, 2516, which includes a volatile memory 2514 and a non-volatile memory 2516, by a bus 2518. The volatile memory 2514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2516 may be implemented by flash memory and/or any other desired type of memory device. Access to the main memory 2514, 2516 of the illustrated example is controlled by a memory controller 2517. In some examples, the memory controller 2517 may be implemented by one or more integrated circuits, logic circuits, microcontrollers from any desired family or manufacturer, or any other type of circuitry to manage the flow of data going to and from the main memory 2514, 2516. In this example, the main memory 2514, 2516 implements the local configuration 508 and the memory 520.

The programmable circuitry platform 2500 of the illustrated example also includes interface circuitry 2520. The interface circuitry 2520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2522 are connected to the interface circuitry 2520. The input device(s) 2522 permit(s) a user (e.g., a human user, a machine user, etc.) to enter data and/or commands into the programmable circuitry 2512. The input device(s) 2522 can be implemented by, for example, an audio sensor, a microphone, a camera (still or video), a keyboard, a button, a mouse, a touchscreen, a trackpad, a trackball, an isopoint device, and/or a voice recognition system.

One or more output devices 2524 are also connected to the interface circuitry 2520 of the illustrated example. The output device(s) 2524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2520 of the illustrated example, thus, typically includes a graphics driver card, a graphics driver chip, and/or graphics processor circuitry such as a GPU. In this example, the interface circuitry 2520 implements some or all of the P2P circuitry 510 and the gossip circuitry 512.

The interface circuitry 2520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2526. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 2500 of the illustrated example also includes one or more mass storage discs or devices 2528 to store firmware, software, and/or data. Examples of such mass storage discs or devices 2528 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 2532, which may be implemented by the machine readable instructions of FIGS. 7-15, may be stored in the mass storage device 2528, in the volatile memory 2514, in the non-volatile memory 2516, and/or on at least one non-transitory computer readable storage medium such as a CD or DVD which may be removable.

Figure 26:
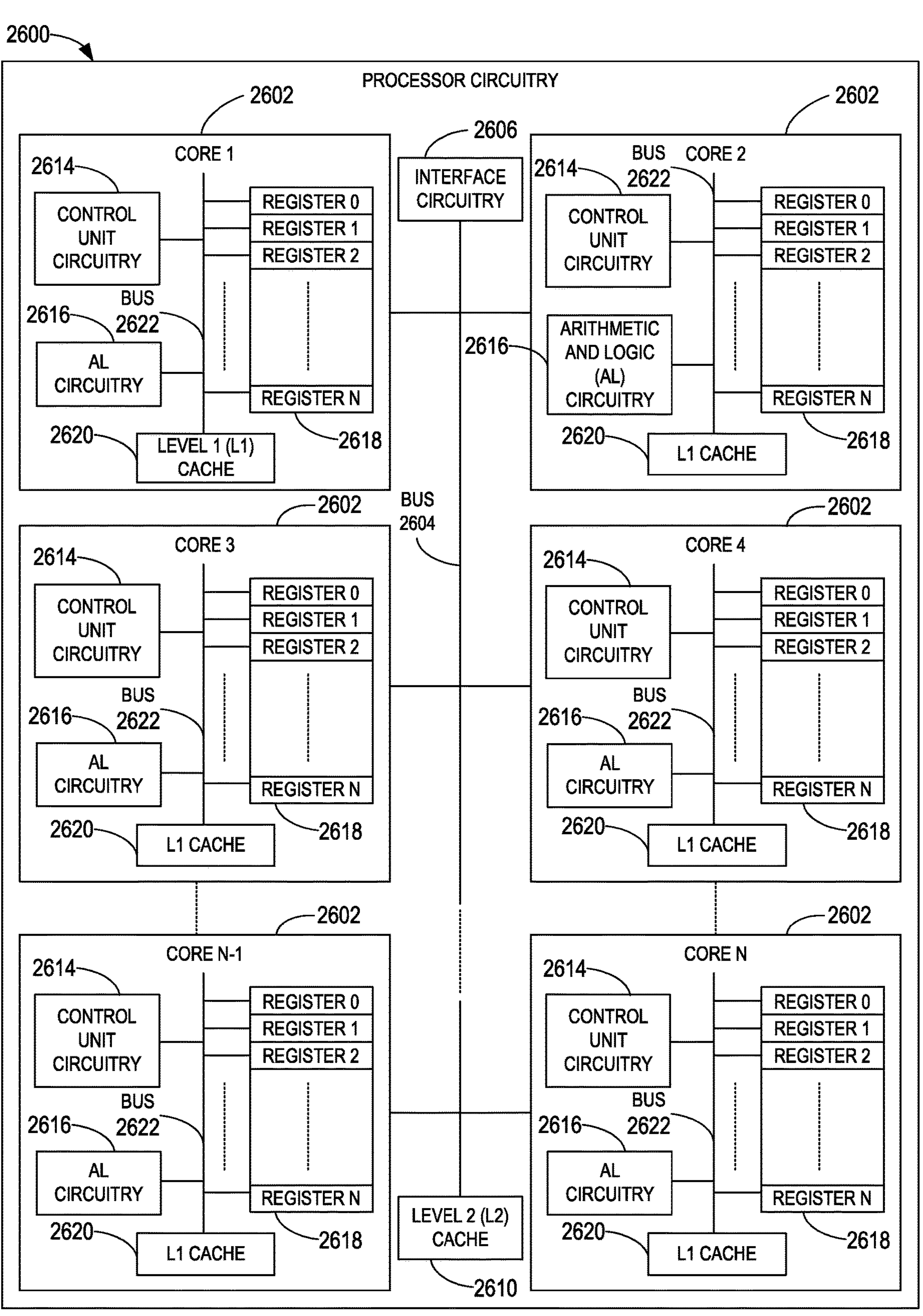
FIG. 26 is a block diagram of an example implementation of the programmable circuitry of FIG. 25.

FIG. 26 is a block diagram of an example implementation of the programmable circuitry 2512 of FIG. 25. In this example, the programmable circuitry 2512 of FIG. 25 is implemented by a microprocessor 2600. For example, the microprocessor 2600 may be a general-purpose microprocessor (e.g., general-purpose microprocessor circuitry). The microprocessor 2600 executes some or all of the machine-readable instructions of the flowcharts of FIGS. 7-15 to effectively instantiate the circuitry of FIG. 2 as logic circuits to perform operations corresponding to those machine readable instructions. In some such examples, the circuitry of FIG. 4 is instantiated by the hardware circuits of the microprocessor 2600 in combination with the machine-readable instructions. For example, the microprocessor 2600 may be implemented by multi-core hardware circuitry such as a CPU, a DSP, a GPU, an XPU, etc. Although it may include any number of example cores 2602 (e.g., 1 core), the microprocessor 2600 of this example is a multi-core semiconductor device including N cores. The cores 2602 of the microprocessor 2600 may operate independently or may cooperate to execute machine readable instructions. For example, machine code corresponding to a firmware program, an embedded software program, or a software program may be executed by one of the cores 2602 or may be executed by multiple ones of the cores 2602 at the same or different times. In some examples, the machine code corresponding to the firmware program, the embedded software program, or the software program is split into threads and executed in parallel by two or more of the cores 2602. The software program may correspond to a portion or all of the machine readable instructions and/or operations represented by the flowcharts of FIGS. 7-15.

The cores 2602 may communicate by a first example bus 2604. In some examples, the first bus 2604 may be implemented by a communication bus to effectuate communication associated with one(s) of the cores 2602. For example, the first bus 2604 may be implemented by at least one of an Inter-Integrated Circuit (I2C) bus, a Serial Peripheral Interface (SPI) bus, a PCI bus, or a PCIe bus. Additionally or alternatively, the first bus 2604 may be implemented by any other type of computing or electrical bus. The cores 2602 may obtain data, instructions, and/or signals from one or more external devices by example interface circuitry 2606. The cores 2602 may output data, instructions, and/or signals to the one or more external devices by the interface circuitry 2606. Although the cores 2602 of this example include example local memory 2620 (e.g., Level 1 (L1) cache that may be split into an L1 data cache and an L1 instruction cache), the microprocessor 2600 also includes example shared memory 2610 that may be shared by the cores (e.g., Level 2 (L2 cache)) for high-speed access to data and/or instructions. Data and/or instructions may be transferred (e.g., shared) by writing to and/or reading from the shared memory 2610. The local memory 2620 of each of the cores 2602 and the shared memory 2610 may be part of a hierarchy of storage devices including multiple levels of cache memory and the main memory (e.g., the main memory 2514, 2516 of FIG. 25). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2602 may be referred to as a CPU, DSP, GPU, etc., or any other type of hardware circuitry. Each core 2602 includes control unit circuitry 2614, arithmetic and logic (AL) circuitry (sometimes referred to as an ALU) 2616, a plurality of registers 2618, the local memory 2620, and a second example bus 2622. Other structures may be present. For example, each core 2602 may include vector unit circuitry, single instruction multiple data (SIMD) unit circuitry, load/store unit (LSU) circuitry, branch/jump unit circuitry, floating-point unit (FPU) circuitry, etc. The control unit circuitry 2614 includes semiconductor-based circuits structured to control (e.g., coordinate) data movement within the corresponding core 2602. The AL circuitry 2616 includes semiconductor-based circuits structured to perform one or more mathematic and/or logic operations on the data within the corresponding core 2602. The AL circuitry 2616 of some examples performs integer based operations. In other examples, the AL circuitry 2616 also performs floating-point operations. In yet other examples, the AL circuitry 2616 may include first AL circuitry that performs integer-based operations and second AL circuitry that performs floating-point operations. In some examples, the AL circuitry 2616 may be referred to as an Arithmetic Logic Unit (ALU).

The registers 2618 are semiconductor-based structures to store data and/or instructions such as results of one or more of the operations performed by the AL circuitry 2616 of the corresponding core 2602. For example, the registers 2618 may include vector register(s), SIMD register(s), general-purpose register(s), flag register(s), segment register(s), machine-specific register(s), instruction pointer register(s), control register(s), debug register(s), memory management register(s), machine check register(s), etc. The registers 2618 may be arranged in a bank as shown in FIG. 26. Alternatively, the registers 2618 may be organized in any other arrangement, format, or structure, such as by being distributed throughout the core 2602 to shorten access time. The second bus 2622 may be implemented by at least one of an I2C bus, a SPI bus, a PCI bus, or a PCIe bus.

Each core 2602 and/or, more generally, the microprocessor 2600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2600 is a semiconductor device fabricated to include many transistors interconnected to implement the structures described above in one or more integrated circuits (ICs) contained in one or more packages.

The microprocessor 2600 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 2600, in the same chip package as the microprocessor 2600 and/or in one or more separate packages from the microprocessor 2600.

Figure 27:
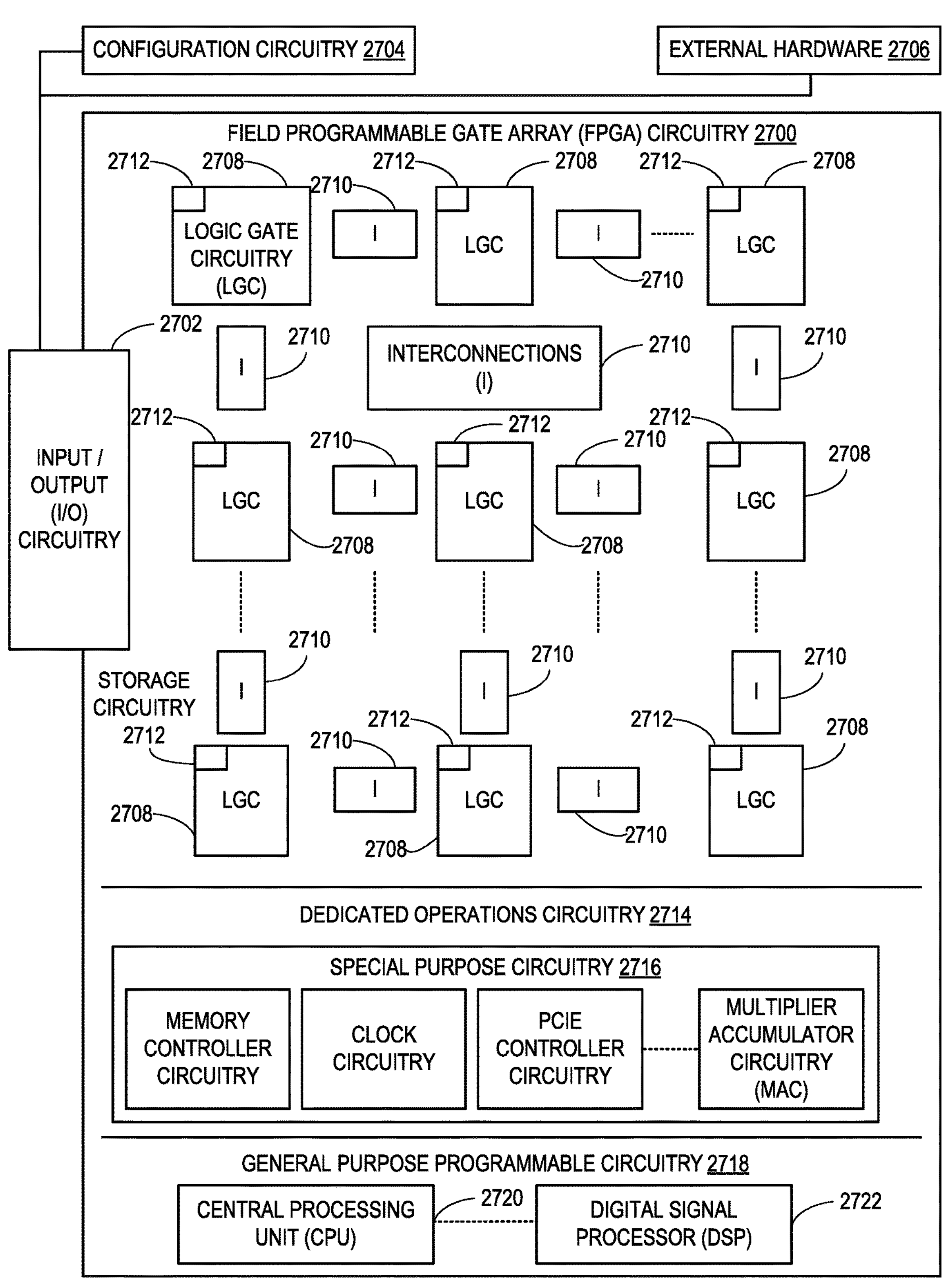
FIG. 27 is a block diagram of another example implementation of the programmable circuitry of FIG. 25.

FIG. 27 is a block diagram of another example implementation of the programmable circuitry 2512 of FIG. 25. In this example, the programmable circuitry 2512 is implemented by FPGA circuitry 2700. For example, the FPGA circuitry 2700 may be implemented by an FPGA. The FPGA circuitry 2700 can be used, for example, to perform operations that could otherwise be performed by the example microprocessor 2600 of FIG. 26 executing corresponding machine readable instructions. However, once configured, the FPGA circuitry 2700 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 2600 of FIG. 26 described above (which is a general purpose device that may be programmed to execute some or all of the machine readable instructions represented by the flowchart(s) of FIGS. 7-15 but whose interconnections and logic circuitry are fixed once fabricated), the FPGA circuitry 2700 of the example of FIG. 27 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 7-15. In particular, the FPGA circuitry 2700 may be thought of as an array of logic gates, interconnections, and switches. The switches can be programmed to change how the logic gates are interconnected by the interconnections, effectively forming one or more dedicated logic circuits (unless and until the FPGA circuitry 2700 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 7-15. As such, the FPGA circuitry 2700 may be configured and/or structured to effectively instantiate some or all of the operations/functions corresponding to the machine readable instructions of the flowchart(s) of FIGS. 7-15 as dedicated logic circuits to perform the operations/functions corresponding to those software instructions in a dedicated manner analogous to an ASIC. Therefore, the FPGA circuitry 2700 may perform the operations/functions corresponding to the some or all of the machine readable instructions of FIGS. 7-15 faster than the general-purpose microprocessor can execute the same.

In the example of FIG. 27, the FPGA circuitry 2700 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 2700 of FIG. 27 may access and/or load the binary file to cause the FPGA circuitry 2700 of FIG. 27 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2700 of FIG. 27 to cause configuration and/or structuring of the FPGA circuitry 2700 of FIG. 27, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 2700 of FIG. 27 may access and/or load the binary file to cause the FPGA circuitry 2700 of FIG. 27 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2700 of FIG. 27 to cause configuration and/or structuring of the FPGA circuitry 2700 of FIG. 27, or portion(s) thereof.

The FPGA circuitry 2700 of FIG. 27, includes example input/output (I/O) circuitry 2702 to obtain and/or output data to/from example configuration circuitry 2704 and/or external hardware 2706. For example, the configuration circuitry 2704 may be implemented by interface circuitry that may obtain a binary file, which may be implemented by a bit stream, data, and/or machine-readable instructions, to configure the FPGA circuitry 2700, or portion(s) thereof. In some such examples, the configuration circuitry 2704 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 2706 may be implemented by external hardware circuitry. For example, the external hardware 2706 may be implemented by the microprocessor 2600 of FIG. 26.

The FPGA circuitry 2700 also includes an array of example logic gate circuitry 2708, a plurality of example configurable interconnections 2710, and example storage circuitry 2712. The logic gate circuitry 2708 and the configurable interconnections 2710 are configurable to instantiate one or more operations/functions that may correspond to at least some of the machine readable instructions of FIGS. 7-15 and/or other desired operations. The logic gate circuitry 2708 shown in FIG. 27 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2708 to enable configuration of the electrical structures and/or the logic gates to form circuits to perform desired operations/functions. The logic gate circuitry 2708 may include other electrical structures such as look-up tables (LUTs), registers (e.g., flip-flops or latches), multiplexers, etc.

The configurable interconnections 2710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2708 to program desired logic circuits.

The storage circuitry 2712 of the illustrated example is structured to store result(s) of the one or more of the operations performed by corresponding logic gates. The storage circuitry 2712 may be implemented by registers or the like. In the illustrated example, the storage circuitry 2712 is distributed amongst the logic gate circuitry 2708 to facilitate access and increase execution speed.

The example FPGA circuitry 2700 of FIG. 27 also includes example dedicated operations circuitry 2714. In this example, the dedicated operations circuitry 2714 includes special purpose circuitry 2716 that may be invoked to implement commonly used functions to avoid the need to program those functions in the field. Examples of such special purpose circuitry 2716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2700 may also include example general purpose programmable circuitry 2718 such as an example CPU 2720 and/or an example DSP 2722. Other general purpose programmable circuitry 2718 may additionally or alternatively be present such as a GPU, an XPU, etc., that can be programmed to perform other operations.

Although FIGS. 26 and 27 illustrate two example implementations of the programmable circuitry 2512 of FIG. 25, many other approaches are contemplated. For example, FPGA circuitry may include an on-board CPU, such as one or more of the example CPU 2720 of FIG. 26. Therefore, the programmable circuitry 2512 of FIG. 25 may additionally be implemented by combining at least the example microprocessor 2600 of FIG. 26 and the example FPGA circuitry 2700 of FIG. 27. In some such hybrid examples, one or more cores 2602 of FIG. 26 may execute a first portion of the machine readable instructions represented by the flowchart(s) of FIGS. 7-15 to perform first operation(s)/function(s), the FPGA circuitry 2700 of FIG. 27 may be configured and/or structured to perform second operation(s)/function(s) corresponding to a second portion of the machine readable instructions represented by the flowcharts of FIG. 7-15, and/or an ASIC may be configured and/or structured to perform third operation(s)/function(s) corresponding to a third portion of the machine readable instructions represented by the flowcharts of FIGS. 7-15.

It should be understood that some or all of the circuitry of FIG. 4 may, thus, be instantiated at the same or different times. For example, same and/or different portion(s) of the microprocessor 2600 of FIG. 26 may be programmed to execute portion(s) of machine-readable instructions at the same and/or different times. In some examples, same and/or different portion(s) of the FPGA circuitry 2700 of FIG. 27 may be configured and/or structured to perform operations/functions corresponding to portion(s) of machine-readable instructions at the same and/or different times.

In some examples, some or all of the circuitry of FIG. 4 may be instantiated, for example, in one or more threads executing concurrently and/or in series. For example, the microprocessor 2600 of FIG. 26 may execute machine readable instructions in one or more threads executing concurrently and/or in series. In some examples, the FPGA circuitry 2700 of FIG. 27 may be configured and/or structured to carry out operations/functions concurrently and/or in series. Moreover, in some examples, some or all of the circuitry of FIG. 4 may be implemented within one or more virtual machines and/or containers executing on the microprocessor 2600 of FIG. 26.

In some examples, the programmable circuitry 2512 of FIG. 25 may be in one or more packages. For example, the microprocessor 2600 of FIG. 26 and/or the FPGA circuitry 2700 of FIG. 27 may be in one or more packages. In some examples, an XPU may be implemented by the programmable circuitry 2512 of FIG. 25, which may be in one or more packages. For example, the XPU may include a CPU (e.g., the microprocessor 2600 of FIG. 26, the CPU 2720 of FIG. 27, etc.) in one package, a DSP (e.g., the DSP 2722 of FIG. 27) in another package, a GPU in yet another package, and an FPGA (e.g., the FPGA circuitry 2700 of FIG. 27) in still yet another package.

Figure 28:
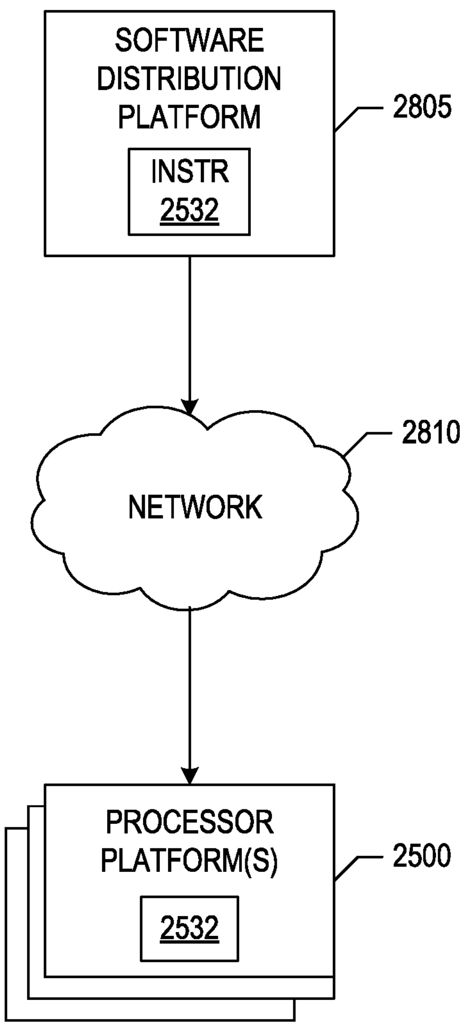
FIG. 28 is a block diagram of an example software/firmware/instructions distribution platform (e.g., one or more servers) to distribute software, instructions, and/or firmware (e.g., corresponding to the example machine readable instructions of FIGS. 7-15) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2805 to distribute software such as the example machine readable instructions 2532 of FIG. 25 to other hardware devices (e.g., hardware devices owned and/or operated by third parties from the owner and/or operator of the software distribution platform) is illustrated in FIG. 28. The example software distribution platform 2805 may be implemented by any computer server, data facility, cloud service, etc., capable of storing and transmitting software to other computing devices. The third parties may be customers of the entity owning and/or operating the software distribution platform 2805. For example, the entity that owns and/or operates the software distribution platform 2805 may be a developer, a seller, and/or a licensor of software such as the example machine readable instructions 2532 of FIG. 25. The third parties may be consumers, users, retailers, OEMs, etc., who purchase and/or license the software for use and/or re-sale and/or sub-licensing. In the illustrated example, the software distribution platform 2805 includes one or more servers and one or more storage devices. The storage devices store the machine readable instructions 2532, which may correspond to the example machine readable instructions of FIGS. 7-15, as described above. The one or more servers of the example software distribution platform 2805 are in communication with an example network 2810, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 2532 from the software distribution platform 2805. For example, the software, which may correspond to the example machine readable instructions of FIG. 7-15, may be downloaded to the example programmable circuitry platform 2500, which is to execute the machine readable instructions 2532 to implement the PACE nodes 402. In some examples, one or more servers of the software distribution platform 2805 periodically offer, transmit, and/or force updates to the software (e.g., the example machine readable instructions 2532 of FIG. 25) to ensure improvements, patches, updates, etc., are distributed and applied to the software at the end user devices. Although referred to as software above, the distributed "software" could alternatively be firmware.

From the foregoing, it will be appreciated that example systems, apparatus, articles of manufacture, and methods have been disclosed to implement a policy-based autonomous cluster at the edge (PACE) architecture in compute nodes. Disclosed systems, apparatus, articles of manufacture, and methods improve the efficiency of using a computing device by implementing a policy document that, when interpreted, enables nodes within a cluster to determine deterministically and independently what the identities, roles, rights, and authorizations of the different nodes in a cluster are. A given PACE node can gossip with other PACE nodes in a cluster until an eventual consensus across the cluster using the policy, global state information, and global attribute information. Furthermore, PACE nodes also include plug-ins that execute application specific logic based on the interpretation of the policy. The use of the PACE agent and plug-in architecture in accordance with the teachings of this disclosure can allow for greater scalability, security, flexibility, and cost savings than edge devices that coordinate operations based on a central entity. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to autonomously implement policies at the edge are disclosed herein. Further examples and combinations thereof include the following.

Example 1 includes a first compute device comprising interface circuitry to connect to a network, instructions, programmable circuitry to interpret a policy based on first state information and second state information to identify a portion of a workload associated with the first compute device, the first state information to describe the first compute device, the second state information obtained via the interface circuitry from a second compute device to describe the second compute device, and provide the identification to an application on the first compute device to cause the application to configure execution of the portion of the workload.

Example 2 includes the first compute device of example 1, wherein the first compute device and a second compute device collectively form a cluster, and the programmable circuitry is to access, via the interface circuitry, a request from a third compute device to join the cluster, the request including first identity information of the third compute device, identify second identity information of the third compute device based on a certificate, verify the second identity information matches the first identity information, and cause the interface circuitry to share the first state information and the second state information with the third compute device.

Example 3 includes the first compute device of example 2, wherein the policy is a first policy, and the programmable circuitry is to access, from the third compute device, an advertisement of a second policy, verify that the third compute device is authorized to initiate a policy change, share the second policy with the second compute device, and replace the first policy with the second policy.

Example 4 includes the first compute device of example 3, wherein the programmable circuitry is to interpret the second policy based on the first state information, the second state information, and third state information describing the third compute device to renew identification of a workload portion associated with the first compute device.

Example 5 includes the first compute device of example 1, wherein the programmable circuitry is to send and receive information through a gossip protocol, the gossip protocol associated with to a keyring data structure including set of future encryption keys, a current encryption key, and a set of past encryption keys, identify a key rotation right based on the policy interpretation, remove a key from the set of past encryption keys, add the current encryption key to the set of past encryption keys, select a key from the set of future encryption keys to be the current encryption key, add a new key to the set of future encryption keys, and send an updated keyring data structure to the second compute device.

Example 6 includes the first compute device of example 1, wherein the programmable circuitry includes one or more of at least one of a central processor unit, a graphics processor unit, or a digital signal processor, the at least one of the central processor unit, the graphics processor unit, or the digital signal processor having control circuitry to control data movement within the programmable circuitry, arithmetic and logic circuitry to perform one or more first operations corresponding to machine-readable data, and one or more registers to store a result of the one or more first operations, the machine-readable data in the first compute device, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuits (ASIC) including logic gate circuitry to perform one or more third operations.

Example 7 includes a non-transitory machine readable storage medium comprising instructions to cause programmable circuitry of a first compute device to at least interpret a policy based on first state information and second state information to identify a portion of a workload associated with the first compute device, the first state information to describe the first compute device, the second state information obtained from a second compute device to describe the second compute device, and provide the identification to an application on the first compute device to cause the application to configure execution based on the portion of the workload.

Example 8 includes the non-transitory machine readable storage medium of example 7, wherein the first compute device and a second compute device collectively form a cluster, and the instructions cause the programmable circuitry to receive a request from a third compute device to join the cluster, the request including first identity information of the third compute device, identify second identity information of the third compute device based on a certificate, verify the second identity information matches the first identity information, and share the first state information and the second state information with the third compute device.

Example 9 includes the non-transitory machine readable storage medium of example 7, wherein the policy is a first policy, and the instructions cause the programmable circuitry to receive, from a third compute device, an advertisement of a second policy, verify that the third compute device is authorized to initiate a policy change, share the second policy with the second compute device, and replace the first policy with the second policy.

Example 10 includes the non-transitory machine readable storage medium of example 9, wherein the programmable circuitry is to interpret the second policy based on the first state information, the second state information, and third state information describing the third compute device to renew identification of a workload portion associated with the first compute device.

Example 11 includes the non-transitory machine readable storage medium of example 7, wherein the instructions cause the programmable circuitry to transmit and receive information through a gossip protocol, the gossip protocol corresponding to a keyring data structure including set of future encryption keys, a current encryption key, and a set of past encryption keys, determine a key rotation right based on the policy interpretation, remove a key from the set of past encryption keys, add the current encryption key to the set of past encryption keys, remove a key from the set of future encryption keys to be the current encryption key, and add a new key to the set of future encryption keys, and transmit an updated keyring data structure to the second compute device.

Example 12 includes a system comprising a cluster including a first compute device and a second compute device, the first compute device to interpret a policy based on first state information and second state information to identify a portion of a workload associated with the first compute device, the first state information to describe the first compute device, the second state information obtained from a second compute device to describe the second compute device, and provide the identification to an application on the first compute device to cause the application to configure execution based on the portion of the workload.

Example 13 includes the system of example 12, wherein the policy interpretation is a first policy interpretation, the portion of the workload is a first workload portion, the second compute device is to perform a second policy interpretation based on the first state information and the second state information, identify the first workload portion corresponds to the first compute device based on the second policy interpretation, identify a second workload portion corresponds to the second compute device based on the second policy interpretation, and configure execution of the second workload portion, and the first compute device is further to identify the second workload portion corresponds to the second compute device based on the first policy interpretation.

Example 14 includes the system of example 13, wherein the first compute device is to cause performance of the first workload portion independently of when the second workload portion is performed by the second compute device.

Example 15 includes the first compute device of example 13, wherein the first compute device is to wait until the second workload portion is completed to cause performance of the first workload portion.

Example 16 includes the system of example 12, wherein the system further includes a third compute device to transmit a request to join the cluster to the first compute device, the request including first identity information of the third compute device, and the first compute device is to identify second identity information of the third compute device based on a certificate, verify the second identity information matches the first identity information, and share the first state information and the second state information with the third compute device.

Example 17 includes the system of example 16, wherein the policy is a first policy, and the first compute device is to access, from the third compute device, an advertisement of a second policy, verify that the third compute device is authorized to initiate a policy change, share the second policy with the second compute device, and replace the first policy with the second policy.

Example 18 includes the system of example 17, wherein the first compute device is to interpret the second policy based on the first state information, the second state information, and third state information describing the third compute device to renew identification of a workload portion associated with the first compute device.

Example 19 includes the system of example 12, wherein the first compute device is to send and receive information through a gossip protocol, the gossip protocol associated with to a keyring data structure including set of future encryption keys, a current encryption key, and a set of past encryption keys, identify a key rotation right based on the policy interpretation, remove a key from the set of past encryption keys, add the current encryption key to the set of past encryption keys, select a key from the set of future encryption keys to be the current encryption key, add a new key to the set of future encryption keys, and send an updated keyring data structure to the second compute device.

Example 20 includes the system of example 12, wherein the first compute device and the second compute device include two or more of at least one of a central processor unit, a graphics processor unit, or a digital signal processor, the at least one of the central processor unit, the graphics processor unit, or the digital signal processor having control circuitry to control data movement within the first compute device, arithmetic and logic circuitry to perform one or more first operations corresponding to machine-readable data, and one or more registers to store a result of the one or more first operations, the machine-readable data in the first compute device, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuits (ASIC) including logic gate circuitry to perform one or more third operations.

Example 21 includes a method comprising interpreting, with a first compute device, a policy based on first state information and second state information to identify a portion of a workload associated with the first compute device, the first state information to describe the first compute device, the second state information obtained from a second compute device to describe the second compute device, and providing, with the first compute device, the identification to an application on the first compute device to cause the application to configure execution based on the portion of the workload.

Example 22 includes the method of example 21, wherein the first compute device and a second compute device collectively form a cluster, and the method further includes receiving a request from a third compute device to join the cluster, the request including first identity information of the third compute device, identifying second identity information of the third compute device based on a certificate, verifying the second identity information matches the first identity information, and sharing the first state information and the second state information with the third compute device.

Example 23 includes the method of example 22, wherein the policy is a first policy, and the method further includes receiving, from the third compute device, an advertisement of a second policy, verifying that the third compute device is authorized to initiate a policy change, sharing the second policy with the second compute device, and replacing the first policy with the second policy.

Example 24 includes the method of example 23, further including interpreting the second policy based on the first state information, the second state information, and third state information describing the third compute device to renew identification of a workload portion associated with the first compute device.

Example 25 includes the method of example 21, further including transmitting and receiving information through a gossip protocol, the gossip protocol corresponding to a keyring data structure including set of future encryption keys, a current encryption key, and a set of past encryption keys, determining a key rotation right based on the policy interpretation, removing a key from the set of past encryption keys, adding the current encryption key to the set of past encryption keys, removing a key from the set of future encryption keys to be the current encryption key, and adding a new key to the set of future encryption keys, and transmitting an updated keyring data structure to the second compute device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A first compute device comprising:

interface circuitry to connect to a network;

instructions;

at least one programmable circuit to be programmed based on the instructions to:

interpret a policy based on a first attribute and a second attribute to identify a first role associated with the first compute device, the first attribute to describe the first compute device, the second attribute obtained via the interface circuitry from a second compute device, the second attribute to describe the second compute device;

establish a consensus with the second compute device to obtain additional information from the second compute device;

reinterpret the policy based on the additional information to identify a second role associated with the first compute device; and provide at least one of the second role or an identified action associated with the second role in the policy to an application on the first compute device to cause the application to perform the identified action based on the policy.

2. The first compute device of claim 1, wherein:

the identified action is a first action; and one or more of the at least one programmable circuit is to transmit the first attribute to the second compute device, the transmission to cause the second compute device to interpret the same policy based on the first and second attributes to identify a second action associated with the second compute device.

3. The first compute device of claim 2, wherein the first action and the second action collectively execute a workload in accordance with the policy.

4. The first compute device of claim 2, wherein one or more of the at least one programmable circuit performs the first action independently of the second action.

5. The first compute device of claim 1, wherein:

the first compute device and a second compute device collectively form a cluster; and one or more of the at least one programmable circuit is to:

access, via the interface circuitry, a request from a third compute device to join the cluster;

cause the interface circuitry to share the first attribute and the second attribute with the third compute device; and verify an identity of the third compute device.

6. The first compute device of claim 1, wherein:

the policy is a first policy; and one or more of the at least one programmable circuit is to:

access, from a third compute device, an advertisement of a second policy;

verify that the third compute device is authorized to initiate a policy change;

share the second policy with the second compute device; and after establishing another consensus with the second compute device and the third compute device, replace the first policy with the second policy.

7. The first compute device of claim 1, wherein one or more of the at least one programmable circuit includes one or more of:

at least one of a central processor unit, a graphics processor unit, or a digital signal processor, the at least one of the central processor unit, the graphics processor unit, or the digital signal processor having control circuitry to control data movement within the at least one programmable circuit, arithmetic and logic circuitry to perform one or more first operations corresponding to machine-readable data, and one or more registers to store a result of the one or more first operations, the machine-readable data in the first compute device;

a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or Application Specific Integrated Circuits (ASIC) including logic gate circuitry to perform one or more third operations.

8. The first compute device of claim 1, wherein one or more of the at least one programmable circuit is to:

reinterpret the policy to determine a right associated with the second role; and reinterpret the policy to determine the identified action based on the right.

9. The first compute device of claim 1, wherein one or more of the at least one programmable circuit is to:

reinterpret the policy to determine an authorization associated with the second role; and reinterpret the policy to determine the identified action based on the authorization.

10. A non-transitory machine readable storage medium comprising instructions to cause at least one programmable circuit of a first compute device to at least:

interpret a policy based on a first attribute and a second attribute to identify a first role associated with the first compute device, the first attribute to describe the first compute device, the second attribute obtained from a second compute device, the second attribute to describe the second compute device;

establish a consensus with the second compute device to obtain additional information from the second compute device;

reinterpret the policy based on additional information to identify a second role associated with the first compute device; and provide at least one of the second role or an identified action associated with the second role in the policy to an application on the first compute device to cause the application to perform the identified action based on the policy.

11. The non-transitory machine readable storage medium of claim 10, wherein:

the identified action is a first action; and the instructions cause one or more of the at least one programmable circuit to transmit the first attribute to the second compute device, the transmission to cause the second compute device to interpret the same policy based on the first and second attributes to identify a second action associated with the second compute device.

12. The non-transitory machine readable storage medium of claim 10, wherein:

the first compute device and a second compute device collectively form a cluster; and the instructions cause one or more of the at least one programmable circuit to:

receive a request from a third compute device to join the cluster;

share the first attribute and the second attribute with the third compute device; and verify an identity of the third compute device.

13. The non-transitory machine readable storage medium of claim 10, wherein:

the policy is a first policy; and the instructions cause one or more of the at least one programmable circuit to:

receive, from a third compute device, an advertisement of a second policy;

verify that the third compute device is authorized to initiate a policy change;

share the second policy with the second compute device; and after establishing another consensus with the second compute device and the third compute device, replace the first policy with the second policy.

14. The non-transitory machine readable storage medium of claim 10, wherein the instructions cause one or more of the at least one programmable circuit to:

access, from the second compute device, an advertisement of a new key;

verify that the second compute device is authorized to initiate a new key; and encrypt communications to the second compute device using the new key.

15. The non-transitory machine readable storage medium of claim 10, wherein the instructions cause one or more of the at least one programmable circuit to:

reinterpret the policy to determine a right associated with the second role; and reinterpret the policy to determine the identified action based on the right.

16. The non-transitory machine readable storage medium of claim 10, wherein the instructions cause one or more of the at least one programmable circuit to:

reinterpret the policy to determine an authorization associated with the second role; and reinterpret the policy to determine the identified action based on the authorization.

17. A system comprising:

a self-organizing cluster including a first compute device and a second compute device, the first compute device to:

interpret a policy based on a first attribute and a second attribute to identify a first role associated with the first compute device, the first attribute to describe the first compute device, the second attribute obtained from a second compute device, the second attribute to describe the second compute device;

establish a consensus with the second compute device to obtain additional information from the second compute device;

reinterpret the policy based on the additional information to identify a second role associated with the first compute device; and provide at least one of the second role or an identified action associated with the second role in the policy to an application on the first compute device to cause the application to perform the identified action based on the policy.

18. The system of claim 17, wherein:

the identified action is a first action; and the second compute device is to interpret the same policy based on the first and second attributes to identify a second action associated with the second compute device.

19. The system of claim 17, wherein the first compute device is to:

reinterpret the policy to determine a right associated with the second role; and reinterpret the policy to determine the identified action based on the right.

20. The system of claim 17, wherein the first compute device is to:

reinterpret the policy to determine an authorization associated with the second role; and reinterpret the policy to determine the identified action based on the authorization.

* * * * *